(12) United States Patent
Katakura et al.

(10) Patent No.: US 6,368,519 B1
(45) Date of Patent: Apr. 9, 2002

(54) ETCHING METHOD AND A METHOD OF MANUFACTURING A MAGNETIC HEAD

(75) Inventors: Toru Katakura, Miyagi; Teiichi Miyauchi; Yuko Takanashi, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,135

(22) Filed: Dec. 9, 1999

(30) Foreign Application Priority Data

Dec. 11, 1998 (JP) ............................................ 10-353341
Mar. 16, 1999 (JP) ............................................ 11-070792

(51) Int. Cl.⁷ ................................................. B44C 1/22
(52) U.S. Cl. .............................. 216/72; 216/22; 216/41; 216/42; 216/49; 216/51; 216/62; 360/110; 360/131; 430/313; 430/319; 204/192.1; 204/192.15; 204/192.2; 29/603.07; 29/603.18
(58) Field of Search ............................... 216/22, 41, 42, 216/49, 51, 64, 72, 62; 360/110, 131; 430/313, 319; 204/192.1, 192.15, 192.2; 29/603.07, 603.18

(56) References Cited

U.S. PATENT DOCUMENTS 5,290,647 A * 3/1994 Miyazaki et al. ............... 430/5
5,679,484 A * 10/1997 Ito et al. ......................... 430/5
6,195,232 B1 * 2/2001 Cohen ......................... 360/126

* cited by examiner

*Primary Examiner*—Randy Gulakowski
*Assistant Examiner*—M. Kornakov
(74) *Attorney, Agent, or Firm*—Sonnenschein, Nath & Rosenthal

(57) ABSTRACT

A magnetic gap is formed to be vertical to the film forming surface of a substrate with high accuracy by a simple method. The method comprises a non-magnetic film forming step of forming a non-magnetic film made of the non-magnetic material on the substrate, a high selectivity film forming step of forming a high selectivity film made of a material which has a higher selectivity ratio with respect to reactive ion etching than the non-magnetic material, on the non-magnetic film formed, a patterning step of patterning the high-selectivity film into a predetermined shape, and an etching step of etching the non-magnetic film by reactive ion etching, using the high selectivity film as a mask.

9 Claims, 35 Drawing Sheets

ETCHING METHOD AND A METHOD OF MANUFACTURING A MAGNETIC HEAD

RELATED APPLICATION DATA

The present application claims priority to Japanese Application No. P10-353341 filed Dec. 11, 1998 and Japanese Application No. P11-070792 filed Mar. 16, 1999, which applications are incorporated herein by reference to the extent permitted by law.

BACKGROUND OF THE INVENTION

1. Technical Field

The present invention relates to an etching method and a method of manufacturing a magnetic head, and more specifically, to a method of manufacturing a magnetic head in which a magnetic gap is formed between non-magnetic materials provided on opposed surfaces of a pair of yoke cores which are formed to be opposed to each other on a substrate.

2. Background Art

In recent years, video tape recorders, audio tape recorders, computer data storage systems, and the like are known as magnetic recording/reproducing apparatuses which use a magnetic tape as a recording medium. As for the magnetic recording medium, there is a demand for increasing the recording density to enhance its capacity and to attain a high data transfer rate.

However, if the magnetic recording medium is improved to have a high recording density in a magnetic recording system, the magnetized information from the magnetic recording medium is so weakened that reproduced signals are difficult to detect for a conventional inductive type magnetic head using electromagnetic induction.

Hence, in bard discs or the like, a magnetic resistance effect type magnetic bead (which will be hereinafter referred to as an MR head) using a magnetic resistance effect element (which will be hereinafter referred to an MR element) made of a soft magnetic film such as NiFe alloy or the like has been used for reproduction of signals.

However, in case where the MR head is set in a helical scan tape system in which the magnetic head is mounted on a rotation drum and recording/reproducing is carried out while rotating the magnetic head, the MR element must be slid on a magnetic tape at a high speed, leading to a problem that the MR element is worn out. Once the MR element is worn out, serious problems are caused, e.g., the output and the bias amount changes, the operation stability is lowered, the resistance value changes, or so.

Therefore, a proposal has been made for a MR head of a yoke type in which an MR element is provided in the head and magnetic flux from a magnetic recording medium is guided to the MR element by a yoke core to reproduce signals. In this yoke type MR head, a pair of yoke cores made of a soft magnetic film are formed so as to be opposed to each other with a non-magnetic film inserted therebetween, on a substrate. The portions of the magnetic film provided at the opposed regions construct a magnetic gap.

In case where the magnetic gap is formed substantially in parallel with the surface of the substrate where a film is formed in the yoke type MR head as described above, the efficiency is degraded if the track width is narrowed as the recording density is increased to be high. Therefore, it is necessary that the magnetic gap is formed to be substantially vertical to the surface of the substrate where the film is formed.

FIGS. 58 to 66 show a first conventional method of forming a gap film. Note that FIGS. 58 to 64 and 66 are views showing the forming method of the magnetic gap film in form of cross-sectional views cut along the line Y1–Y2 in FIG. 65.

At first, as shown in FIG. 58, a Cr film 31 and a SiO2 film 32 are formed in this order on a substrate 30. Next, as shown in FIG. 59, a resist 33 is applied onto the SiO2 film 32 and is patterned into a predetermined shape. Specifically, a mask pattern is formed in which the resist 33 remains only one of parts of the substrate 30 divided along the portions where the magnetic gap is formed. Further, as shown in FIG. 60, etching is carried out with the mask pattern used as a mask, and the portions of the SiO2 film 32 which is exposed from the mask is removed.

Next, as shown in FIG. 61, a gap film 34 is formed entirely on the substrate 30 and the resist 33, with the resist 33 remaining. Next, as shown in FIG. 62, the resist 33 is peeled together with the gap film 34 formed on the resist. Further, as shown in FIG. 63, the remaining SiO2 film 32 is removed by reactive etching. At this time, the gap film 34 formed on the substrate is removed except for the portion thereof which forms finally a magnetic gap.

Further, as shown in FIG. 64, a magnetic film 35 which forms part of a yoke core is formed on the entire surface, and the surface is polished, thereby forming the gap film 34 to be substantially vertical to the film forming surface of the substrate 30. Further, yoke cores are patterned as indicated by a broken line in FIG. 65.

Also, FIGS. 67 to 76 show a second conventional method of forming a gap film.

At first, as shown in FIG. 67, a first magnetic film 41 is formed on the entire surface on a substrate 40. Next, as shown in FIGS. 68 and 69, a resist 42 is applied onto the first magnetic film 41 and is patterned into a predetermined shape. Specifically, the mask pattern should be such that the resist 42 remains on the portion which forms one of a pair of yoke cores. Further, as shown in FIG. 70, etching is carried out with the mask pattern used as a mask, to remove the first magnetic film 41 exposed from the mask. At last, the resist 42 is removed so that one yoke core is formed as shown in FIGS. 71 and 72.

Next, as shown in FIG. 73, a gap film 44 is formed on the entire surface, and further, a second magnetic film 45 is formed on the gap film 44. Further, the surface of the second magnetic film 45 is polished so that a pair of yoke cores are formed as shown in FIGS. 75 and 76 and part of the gap film 44 is formed to be substantially vertical to the film forming surface of the substrate 40. Further, as indicated by broken lines in FIG. 75, patterning forms the yoke cores.

In the conventional methods as described above, since yoke cores are formed one after another, the manufacturing steps are complicated. Also, in the second forming method, a difference in thickness appears between the yoke cores and causes a drawback that the off-track characteristic is deteriorated.

SUMMARY OF THE INVENTION

The present invention has been proposed in view of the actual situation of conventional techniques as described above, and has an object of providing an etching method and a method of manufacturing a magnetic head which are capable of forming a magnetic gap substantially vertical to the film forming surface of a substrate by a simple method with high accuracy.

According to the present invention, there is provided a method for manufacturing a magnetic head comprising a substrate and a pair of yoke cores formed on the substrate, provided so as to oppose each other, with a non-magnetic material provided between the pair of yoke cores thereby to form a magnetic gap, the method comprising: a non-magnetic film forming step of forming a non magnetic film made of the non-magnetic material on the substrate; a high selectivity film forming step of forming a high selectivity film made of a material which has a higher selectivity ratio with respect to reactive ion etching than the non-magnetic material, on the non-magnetic film formed in the non-magnetic film forming step; a patterning step of patterning the high-selectivity film formed in the high-selectivity film forming step, into a predetermined shape; and an etching step of etching the non-magnetic film by reactive ion etching, using the high selectivity film patterned into the predetermined shape as a mask.

In the method according to the present invention as described above, the non-magnetic film is etched by reactive ion etching with the patterned high selectivity film used as a mask. Therefore, the non-magnetic film which forms a magnetic gap can be formed with ease. Also, in the method of manufacturing a magnetic head, a fine magnetic gap can be formed with excellent accuracy since a high selectivity film made of a material having a higher selectivity ratio with respect to reactive etching than the non-magnetic film is used as a mask.

Also, according to the present invention, there is provided an etching method comprising: a high selectivity film forming step of forming, on a material to be etched, a high selectivity film made of a metal material which is more hardly etched through reactive ion etching than the material to be etched; a patterning step of patterning the high selectivity film formed in the high selectivity film forming step, into a predetermined shape; a novolak-resin-based resist forming step of forming a resist made of a novolak-resin-based material, on the high selectivity film patterned into the predetermined shape in the patterning step; and an etching step of etching the material to be etched, by reactive ion etching, using the high selectivity film patterned into the predetermined shape in the patterning step as a mask.

DESCRIPTION OF THE PREFERRED EMBODIEMENTS

In the following, the first embodiment of the present invention will be specifically explained with reference to the drawings.

Figure 1:
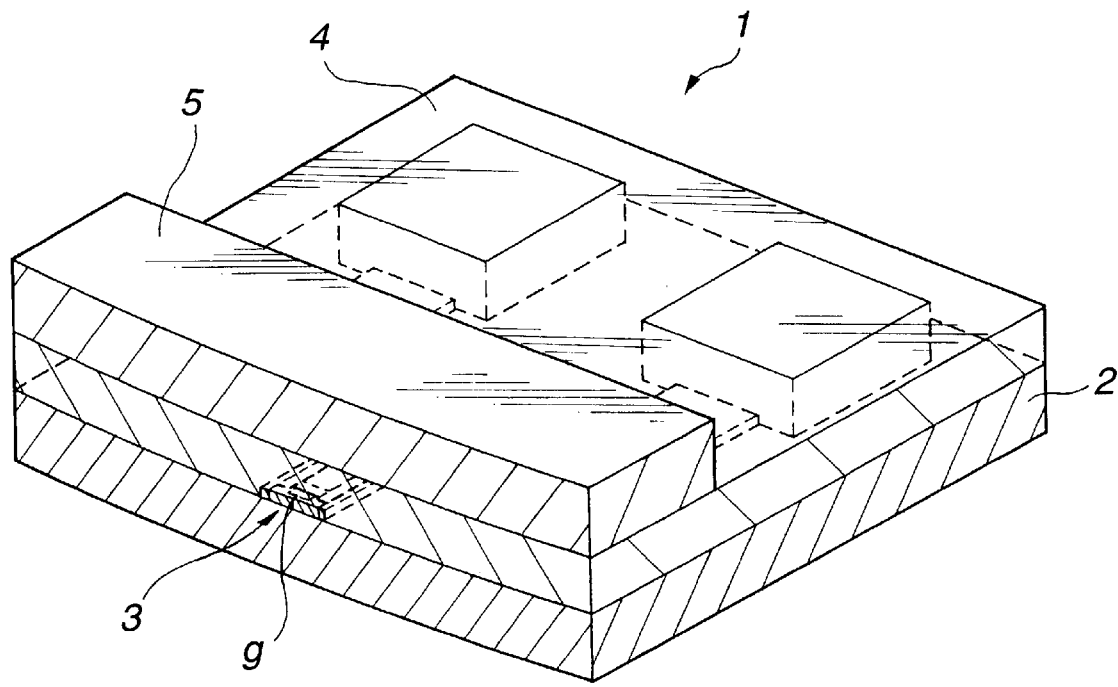
FIG. 1 is a perspective view showing a structure example of an MR head according to the first embodiment.
Figure 2:
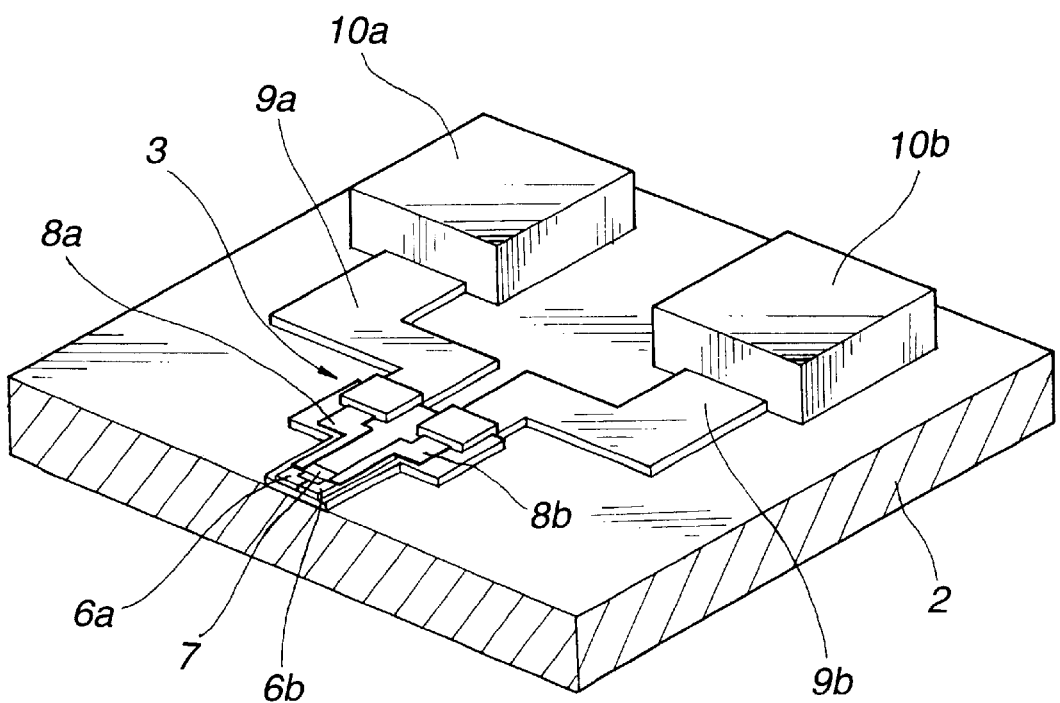
FIG. 2 is a perspective view showing a main part of the MR head shown in FIG. 1.

An example of a structure manufactured by the method adopting the present invention will be shown in FIGS. 1 and 2. The MR head 1 comprises a first substrate 2, an MR head element 3 formed on the first substrate 2, a protect film 4 formed on the MR head element 3, and a second substrate 5 bonded on the protect film 4. FIG. 1 is a perspective view showing an example of the MR head 1, and FIG. 2 is a perspective view showing the structure of the MR head element 3 where the protect film 4 and the second substrate 5 are removed therefrom.

The first substrate 2 and the second substrate 5 serve as guard materials for the MR head element 3, and a hard material having a high resistivity such as calcium titanate or the like is used. Meanwhile, Al2O3 or the like is used for the protect film 4.

Further, as shown in FIG. 2, the MR head element 3 comprises a pair of yoke cores 6a and 6b arranged at a predetermined interval and respectively having end portions exposed to an opposed surface of a magnetic recording medium, a magnetic resistance effect element 7 which is provided at the other end portions of the pair of yoke cores 6a and 6b so as to bridge the yoke cores 6a and 6b and has a substantially rectangular flat shape whose longer edges are substantially parallel to the sliding surface of the recording medium, first lead conductors 8a and 8b respectively provided at both end portions of the magnetic resistance effect element 7 in its lengthwise direction, a second lead conductor 9a provided at an end portion of the first lead conductor 8a, and a second lead conductor 9b provided at an end portion of the first lead conductor 8b. Also, in this MR head element 3, an external terminal 10a is formed at an end portion of the second lead conductor 9a, and an external terminal 10b is formed at an end portion of the section lead conductor 9b. In addition, the yoke cores 6a and 6b and the magnetic resistance effect element 7 are insulated from each other by an insulating film not shown.

The yoke cores 6a and 6b are made of a soft magnetic material, and end portions of the cores are exposed to the sliding surface of the magnetic recording medium, thereby to guide the magnetic flux from the magnetic recording medium to the magnetic resistance effect element 7. Further, the pair of yoke cores 6a and 6b are provided to be opposed to each other, and their opposed portions are provided with a non-magnetic film, thereby forming a magnetic gap g. This non-magnetic film is made of SiO2 or the like, for example.

The magnetic resistance effect element 7 creates a magnetic resistance effect and is formed by layering a magnetic resistance effect film as a magnetic sensing portion, and a soft magnetic film (so-called an SAL film) for applying a bias magnetic field to the magnetic resistance effect film by an SAL bias method. This soft magnetic film serves to apply a bias magnetic field to the magnetic resistance effect film thereby to increase the linearity of detected signals.

A known soft magnetic material is used for the magnetic resistance effect film described above. For example, the material may be NiFe, NiFeCo, permalloy NiFe-X (where X is Ta, Cr, Nb, Rh, Zr, Mo, Al, Au, Pd, Pt, Si, or the like or a combination of several of these elements), CoZr-based amorphous material, or the like.

The first lead conductors 8a and 8b and the second lead conductors 9a and 9b are each made of a conductive film and serve as electrodes for supplying a sensing current to the magnetic resistance effect element 7.

The external terminals 10a and 10b are provided to make electric connection to the outside. The external terminal 10a is formed at the end portion of the second lead conductor 9a which is opposite to its another end portion connected to the first lead conductor 8a, and the external terminal 10b is formed at the end portion of the second lead conductor 9b which is opposite to its another end portion connected to the first lead conductor 8a.

When a recorded signal is read from a magnetic recording medium with use of the MR head 1 described above, a sensing current is supplied to the magnetic resistance effect element 7 through the second lead conductors 9a and 9b and the first lead conductors 8a and 8b from the external terminals 10a and 10b formed at end portions of the second lead conductors 8a and 8b, such that the sensing current flows along the lengthwise direction of the magnetic resistance effect element 7. Further, a change of the resistance of the magnetic resistance effect element 7, which is caused by the magnetic field from the magnetic recording medium, is detected by the sensing current, and the recorded signal is thereby reproduced from the magnetic recording medium. In the MR head 1, the magnetic field from the magnetic recording medium is transferred to the magnetic resistance effect element 7 through the yoke cores 6a and 6b.

In general, an MR head using a magnetic resistance effect is more suitable for high-density recording than an inductive type magnetic head which uses electromagnetic induction for recording/reproducing. Therefore, recording with a higher density can be achieved by using an MR head as a magnetic head.

Also, in this yoke type MR head 1, magnetic flux from the magnetic recording medium is guided to the magnetic resistance effect element 7 by the yoke cores 6a and 6b, and therefore, the MR element itself is not exposed from the surface which slides on the magnetic recording medium. Accordingly, in this MR head 1, the magnetic resistance effect element 7 is not worn, and it is thus possible to solve problems caused due to abrasion of the element 7, e.g., deterioration of the sensitivity, changes of the bias amount, deterioration of stable operation, changes of the resistance value, and the like.

Next explanation will be made of a method of manufacturing the MR head 1 according to the first embodiment described above. Note that in the drawings referred to in the following explanation, characterizing parts are shown as enlarged views in cases, in order to simplify illustration of characterizing features, so the proportions of respective members are not always equal to those of actual sizes. In addition, in actual manufacturing steps, a large number of magnetic head elements are formed on a substrate by thin film techniques, although the drawings below deal with only those portions that relate to one magnetic head element.

At first, a first substrate 2 made of a hard material having a high resistivity is prepared, and the surface of this substrate is polished. The material having a high resistivity used for the first substrate may be calcium titanate or the like.

Figure 3:
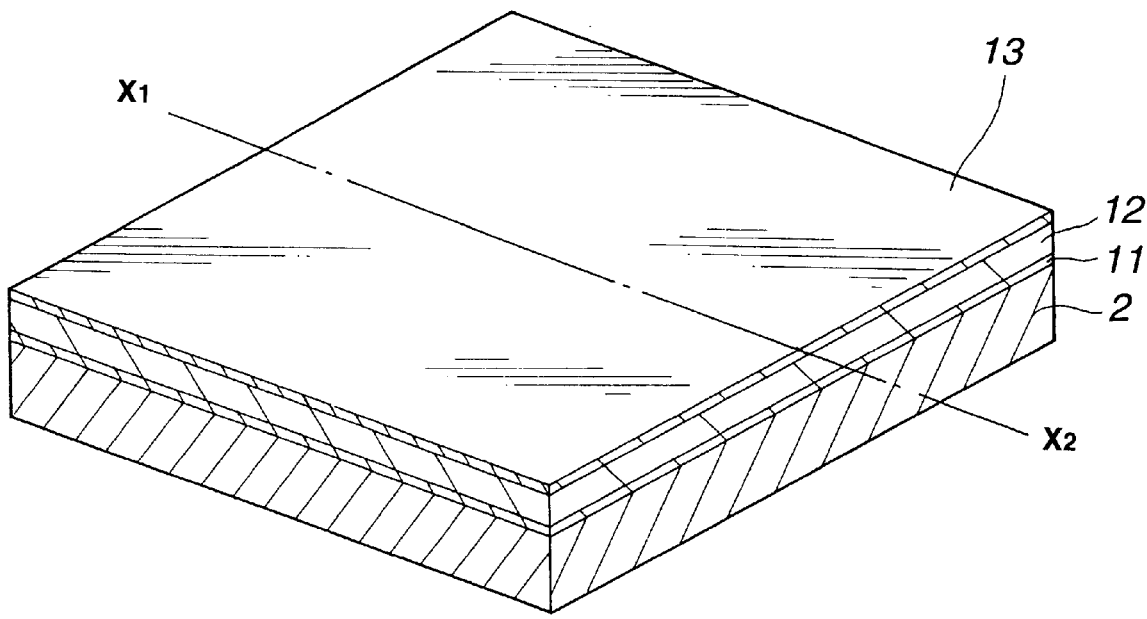
FIG. 3 is a perspective view explaining the method of manufacturing the MR head according to the embodiment 1, wherein a first Cr film, an SiO2 film, and a second Cr film are formed on a first substrate.
Figure 4:
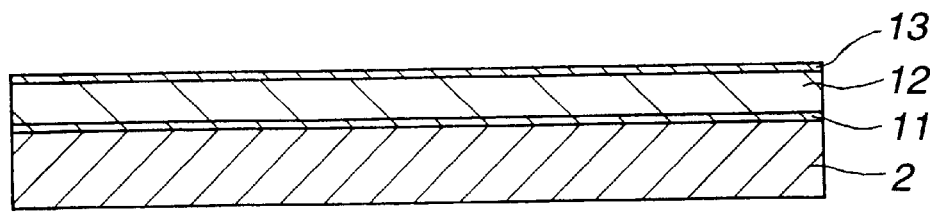
FIG. 4 is a cross-sectional view cut along the line X1–X2 in FIG. 3.

Next, as shown in FIGS. 3 and 4, Cr is coated with thickness of, for example, about 50 nm on the first substrate 2 by sputtering, to form a first Cr film 11. Further, on the first Cr film 11, SiO2 is coated with thickness of, for example, about 2.5 m on the first Cr film 11, to form an SiO2 film 12. Further, on the SiO2 film 12, Cr is coated with thickness of, for example, about 50 mn by sputtering, to form a second Cr film 13.

The $SiO_2$ film 12 serves to form a magnetic gap g formed between the yoke cores 6a and 6b. In addition, the second Cr film 13 serves as a mask when etching The $SiO_2$ film 12 by reactive ion etching as will be explained later. Further, the etching amount of the $SiO_2$, film 12 may be a function of the first Cr film 11. The first Cr film 11 also serves to maintain excellent surface roughness of the substrate after etching the $SiO_2$ film 12.

Figure 5:
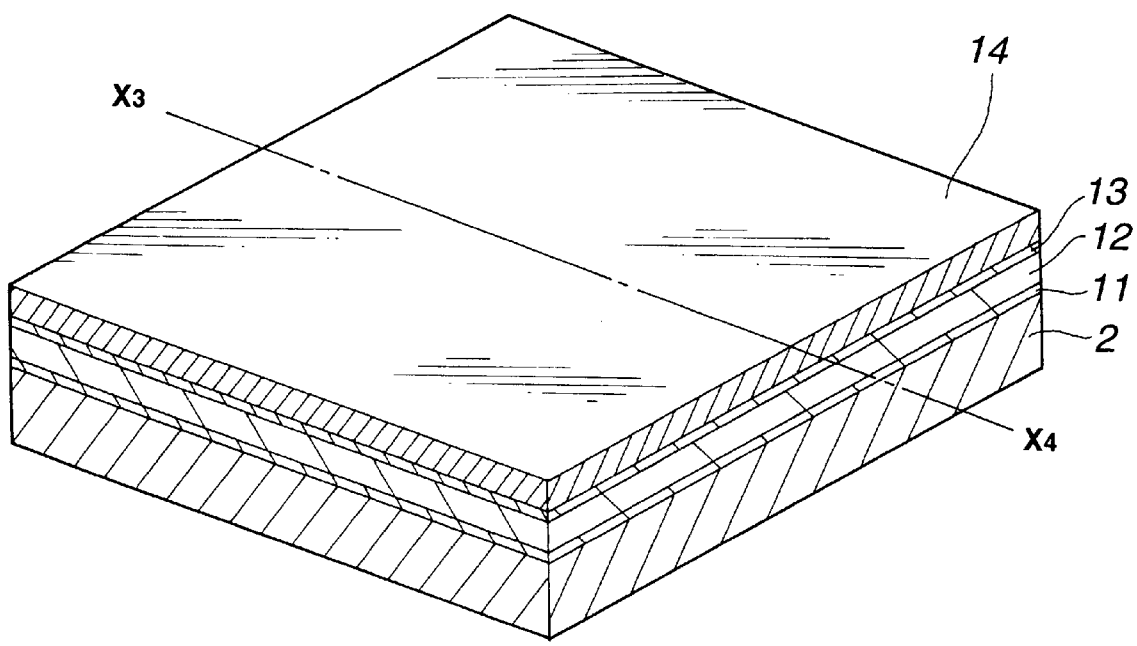
FIG. 5 is a perspective view explaining the method of manufacturing the MR head according to the embodiment 1, wherein an electron beam resist is applied on the second Cr film.
Figure 6:
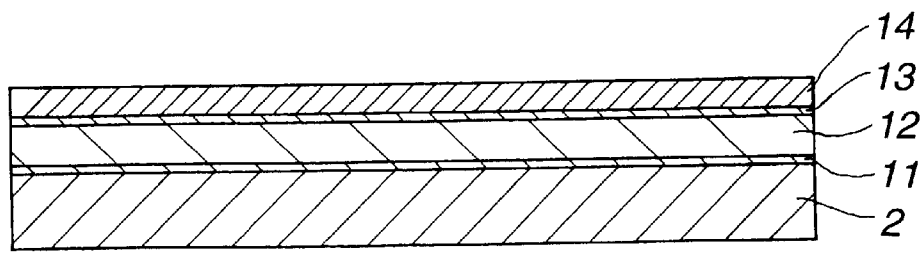
FIG. 6 is a cross-sectional view cut along the line X3–X4 in FIG. 5.

Next, as shown in FIGS. 5 and 6, an electron beam resist 14 is applied onto the second Cr film 13 while the first substrate 2 on which the first Cr film 11, the SiO2 film 12, and the second Cr film 13 are formed is rotated at about 3000 rpm.

In this case, the electron beam resist means such a resist in which macromolecules forming the resist receives energy by collision with electrons and are thereby partially unchained into smaller molecules or are polymerized into larger macromolecules. Also, the electron beam resist 14 is preferably a positive resist which increases solubility to a developing solution in those portions where an electron beam is irradiated. This kind of positive electron resist 14 may be, for example, OEBR-1000 (commercial name) manufactured by TOKYO OHKA KOGYO CO., LTD, or so. In addition, it is preferable to carry out pre-baking on the electron beam resist 14 before exposure. By thus pre-baking the electron beam resist 14, the sensitivity of the electron beam resist 14 is improved so that fine patterns can be formed with excellent accuracy.

Next, with use of an electron beam exposure device, an electron beam is irradiated along a predetermined pattern on the electron beam resist 14, to form a predetermined latent pattern image in the electron beam resist 14. Specifically, an electron beam is irradiated on the regions which form the yoke cores 6a and 6b.

Figure 7:
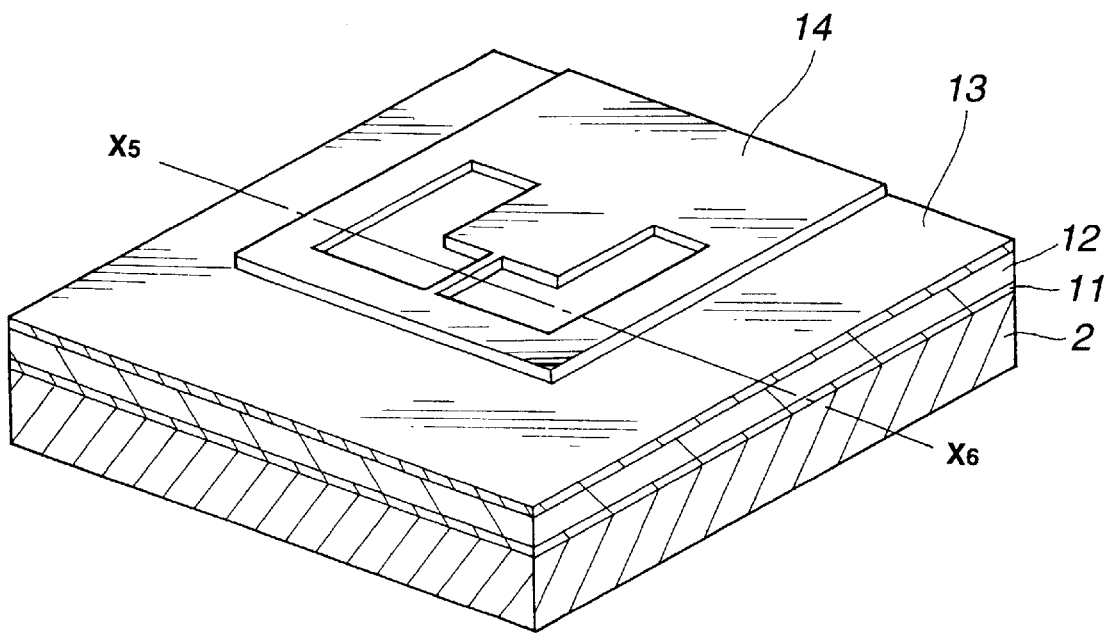
FIG. 7 is a perspective view explaining the method of manufacturing the MR head according to the embodiment 1, wherein the electron beam resist is developed to form a mask pattern.
Figure 8:
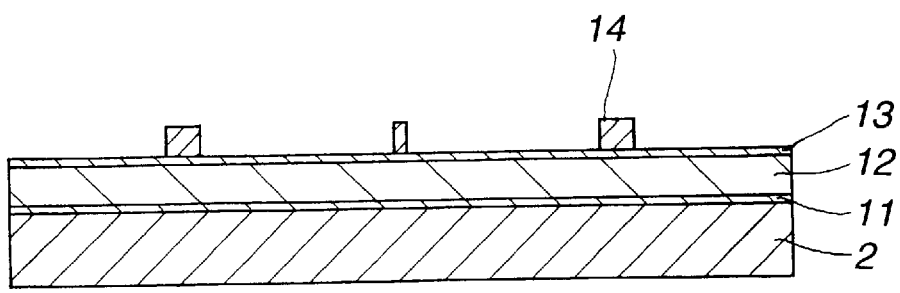
FIG. 8 is a cross-sectional view cut along the line X5–X6 in FIG. 7.

Next, as shown in FIGS. 7 and 8, the electron beam resist 14 I which a latent pattern image is formed is developed to form a mask pattern. In case where a positive resist is used as the electron beam resist 14, those portions of resist where no electron beam has been irradiated remain and form a mask pattern.

Figure 9:
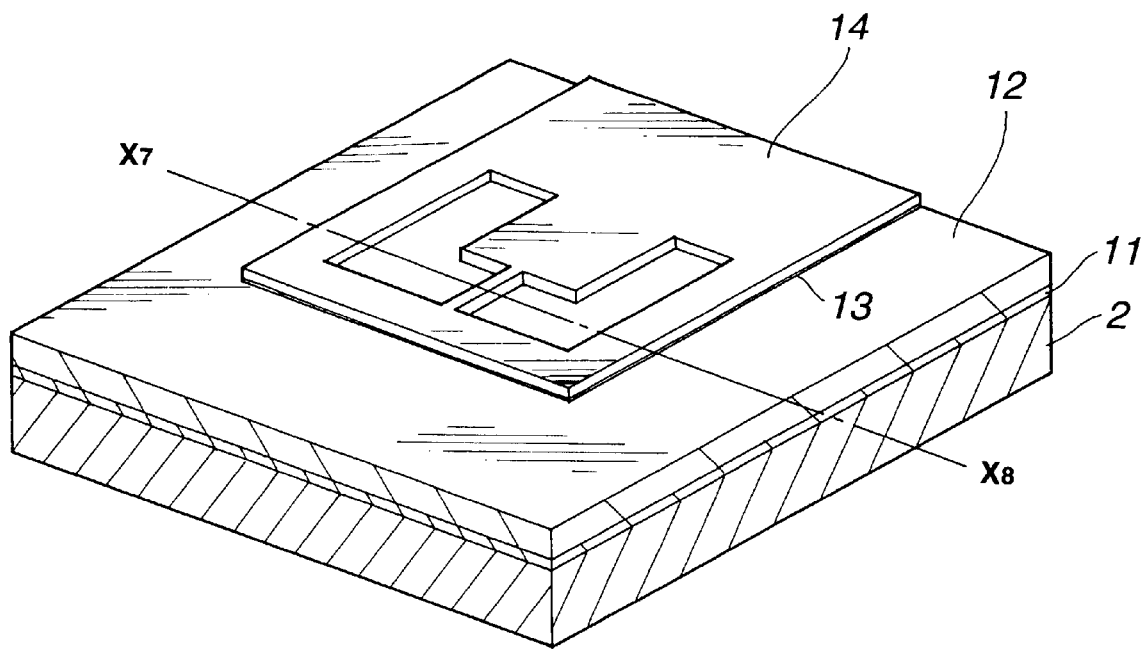
FIG. 9 is a perspective view explaining the method of manufacturing the MR head according to the embodiment 1, wherein the second Cr film is etched with the mask pattern used as a mask.
Figure 10:
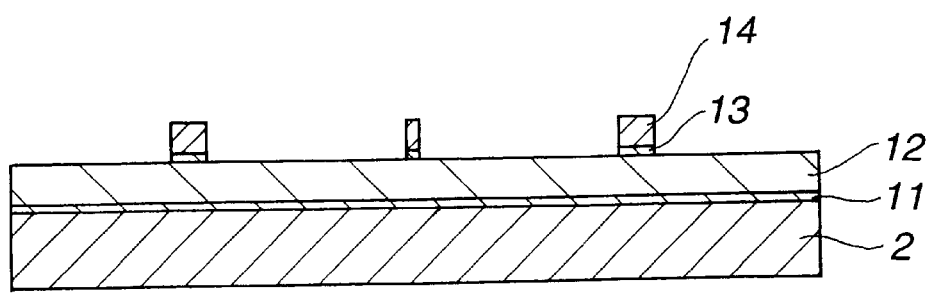
FIG. 10 is a cross-sectional view cut along the line X7–X8 in FIG. 9.
Figure 11:
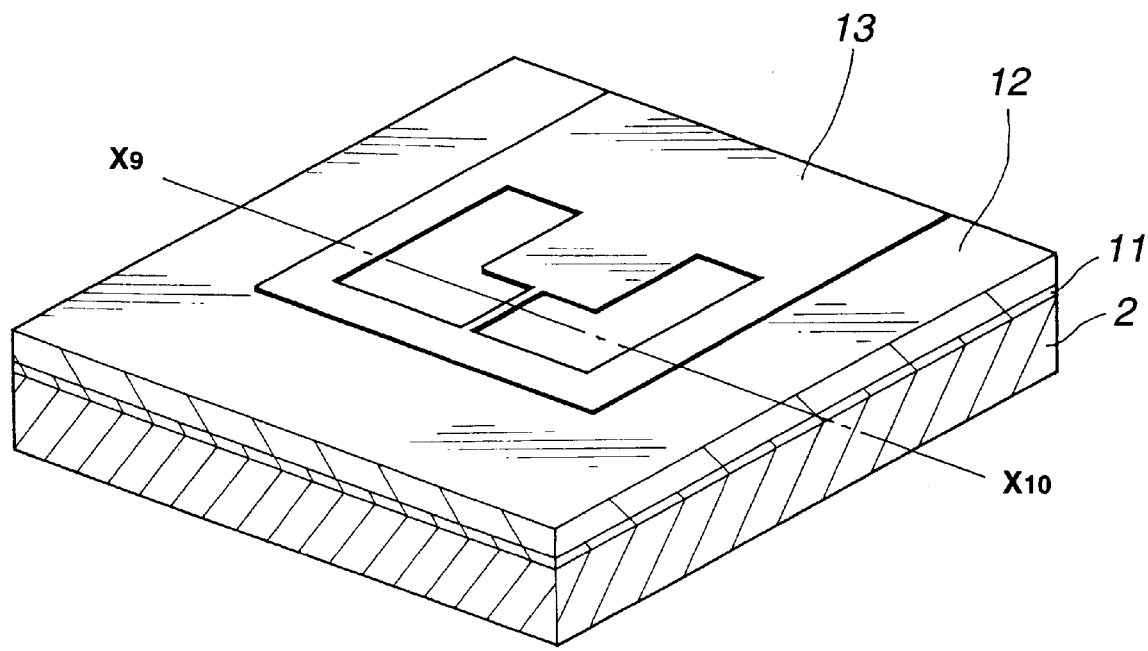
FIG. 11 is a perspective view explaining the method of manufacturing the MR head according to the embodiment 1, wherein the second Cr film is patterned into a predetermined shape.
Figure 12:
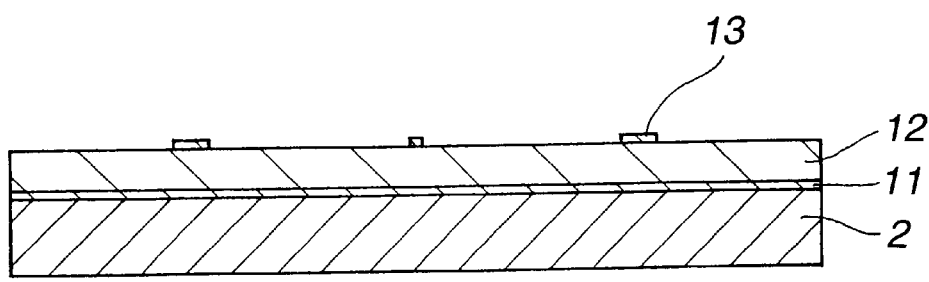
FIG. 12 is a cross-sectional view cut along the line X9–X10 in FIG. 11.

Next, as shown in FIGS. 9 and 10, etching is carried out while using the mask pattern prepared as described above, as a mask. Those portions of the second Cr film 13 that are exposed from the mask pattern are removed thereby. The etching is performed by ion etching. At last, the electron beam resist 14 is peeled. As a result, a second Cr film 13 patterned into a predetermined shape is obtained as shown in FIGS. 11 and 12. Specifically, the pattern has opening portions at those regions that will form the yoke cores 6a and 6b. At this time, the portion through which the portions for forming the yoke cores 6a and 6b are opposed to each other corresponds to the portion of the magnetic gap g, which has a width of about 0.15 m, for example.

Figure 13:
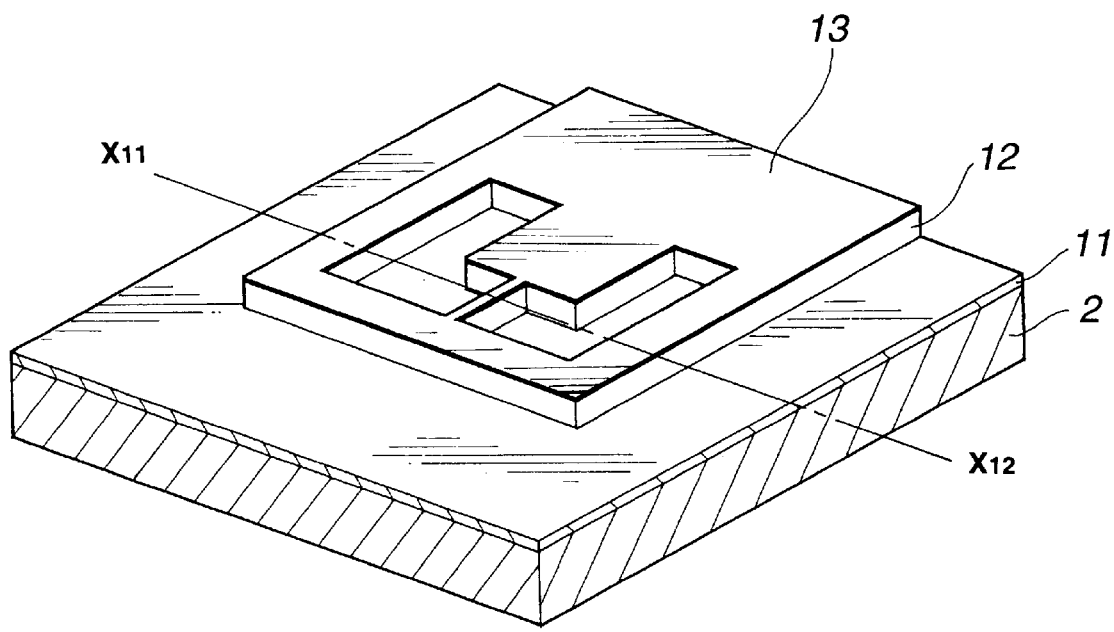
FIG. 13 is a perspective view explaining the method of manufacturing the MR head according to the embodiment 1, wherein the SiO2 film is etched with the second Cr film used as a mask.
Figure 14:
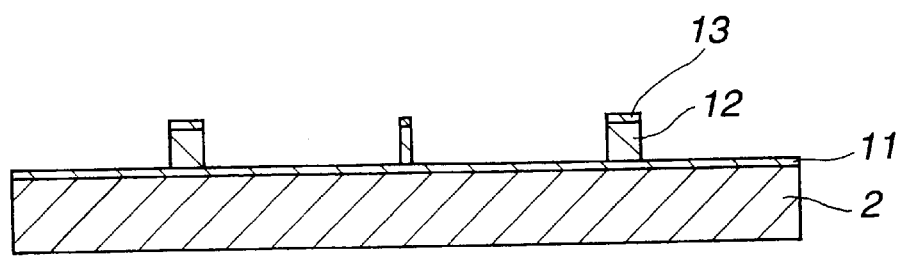
FIG. 14 is a cross-sectional view cut along the line X11–X12 in FIG. 13.

Next, as shown in FIGS. 13 and 14, etching is carried out using the second Cr film 13 patterned as described above as a mask, to remove the SiO2 film exposed from the mask. This etching is reactive ion etching, and as a result, the portions of the SiO2 film 12 which form yoke cores 6a and 6b are removed.

A mixed gas of CF4 and oxygen is used as the gas for the etching so that polymerized materials might not be created on the surface of the SiO2 film 12. In addition, to prevent temperature increase of the substrate surface, the etching power is set to a low power. The etching time is set to be longer by about 10% to 20% than the time required for etching the SiO2 film 12. At this time, if the etching time is long, the etching stops due to the first Cr film 11, and therefore, the first substrate 2 is not etched but excellent surface roughness of the substrate can be maintained.

The Cr which forms the mask for etching the SiO2 film 12 is a material which has about 40 times higher selectivity with respect to reactive ion etching than SiO2. By thus using a mask made of a material having higher selectivity with respect to reactive ion etching than SiO2, a non-magnetic film for forming a magnetic gap g can be formed with high accuracy. In addition, by using a mask thus having high selectivity with respect to reactive ion etching, the thickness of the mask can be reduced so that the cost can be reduced and the production period can be shortened.

Figure 15:
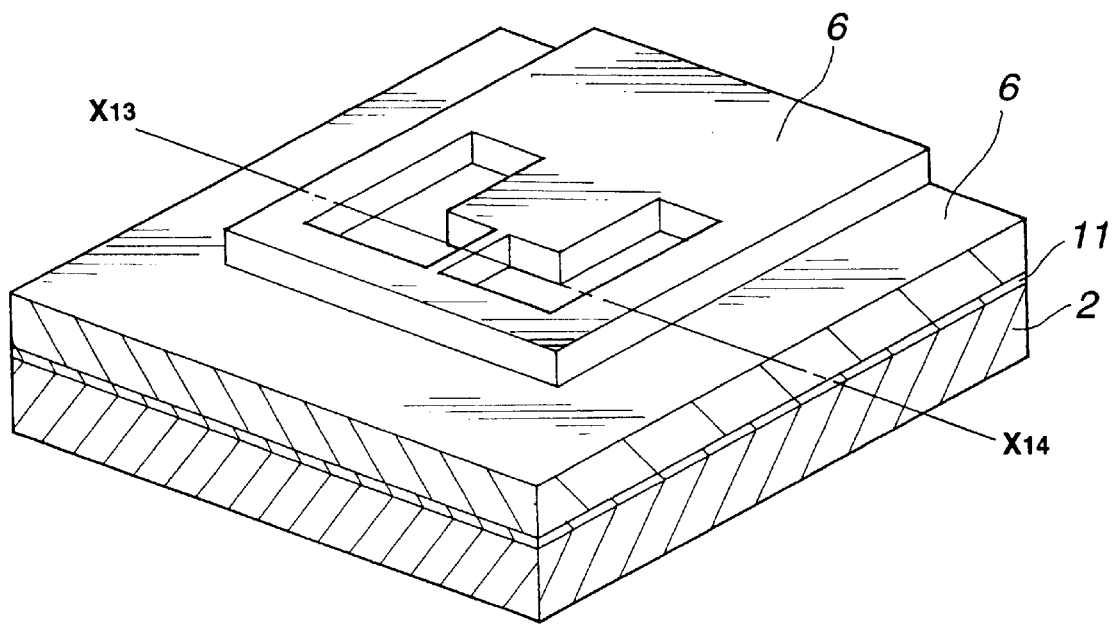
FIG. 15 is a perspective view explaining the method of manufacturing the MR head according to the embodiment 1, wherein a magnetic film is formed on the entire surface.
Figure 16:
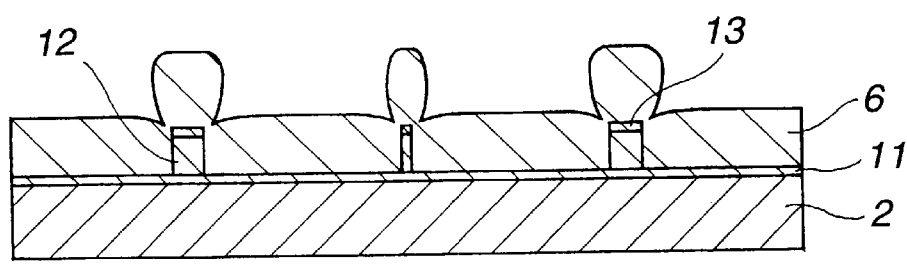
FIG. 16 is a cross-sectional view cut along the line X13–X14 in FIG. 15.

Next, as shown in FIGS. 15 and 16, a magnetic material is coated on the entire surface by sputtering, to form a magnetic film 6 which forms the yoke cores 6a and 6b. At this time, the sputtering is preferably collimation sputtering which uses a parallel plate. By performing collimation sputtering, the incidence angle of the magnetic material to the substrate is controlled so that sticking of the film to concave portions is improved and the characteristics can be thereby improved.

Figure 17:
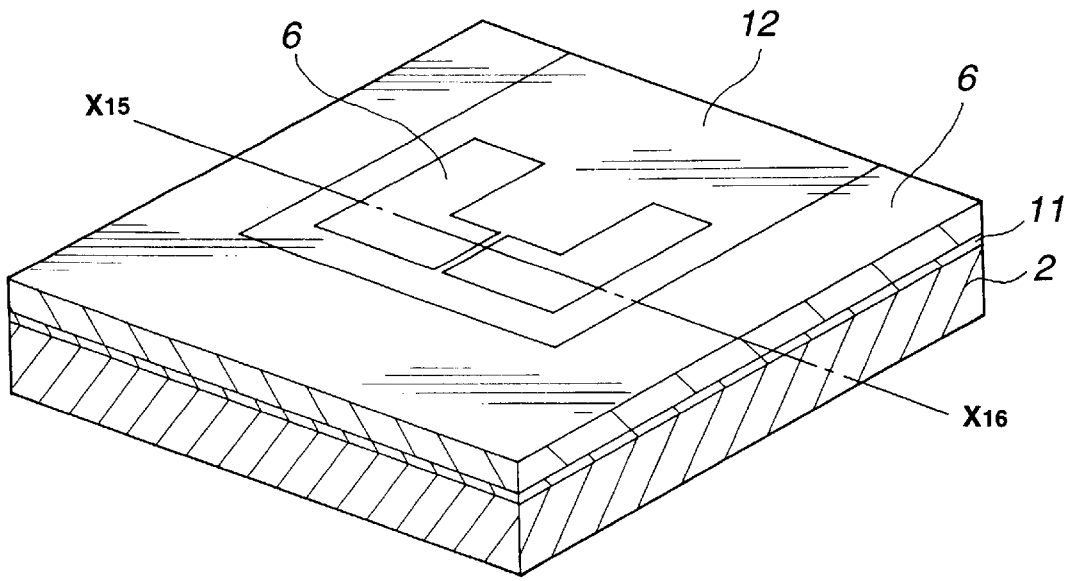
FIG. 17 is a perspective view explaining the method of manufacturing the MR head according to the embodiment 1, wherein the surface of the magnetic film is polished.
Figure 18:
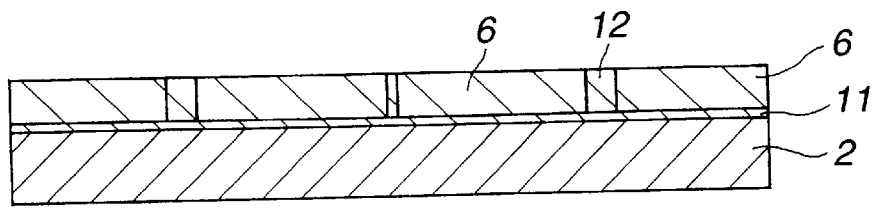
FIG. 18 is a cross-sectional view cut along the line X15–X16 in FIG. 17.

Next, as shown in FIGS. 17 and 18, the entire surface of this magnetic film 6 is polished. As a result, those portions that finally form the yoke cores 6a and 6b are buried in the SiO2 film 12. In this case, the thickness of the yoke cores 6a and 6b is set to predetermined thickness, e.g., about 2.0 m.

Figure 19:
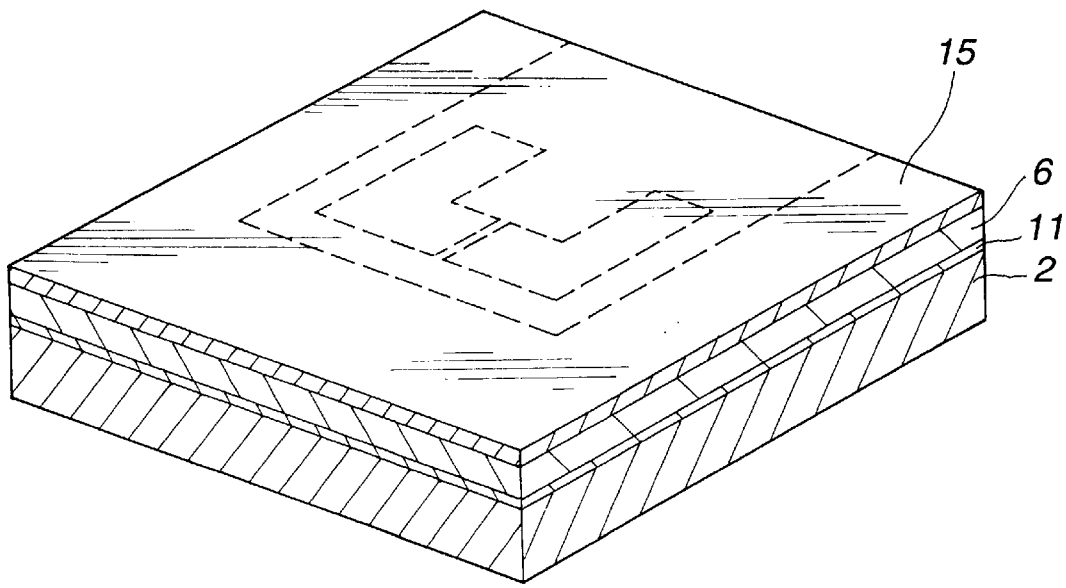
FIG. 19 is a perspective view explaining the method of manufacturing the MR head according to the embodiment 1, wherein an insulating film is formed.

Next, as shown in FIG. 19, an insulating material is coated on the entire surface by sputtering, to form an insulating film 15, and the surface of this film is buffed. This insulating film 15 makes insulation between the MR element and the yoke cores 6a and 6b. For example, Al2O3 or SiO2 is used for the insulating film.

Figure 20:
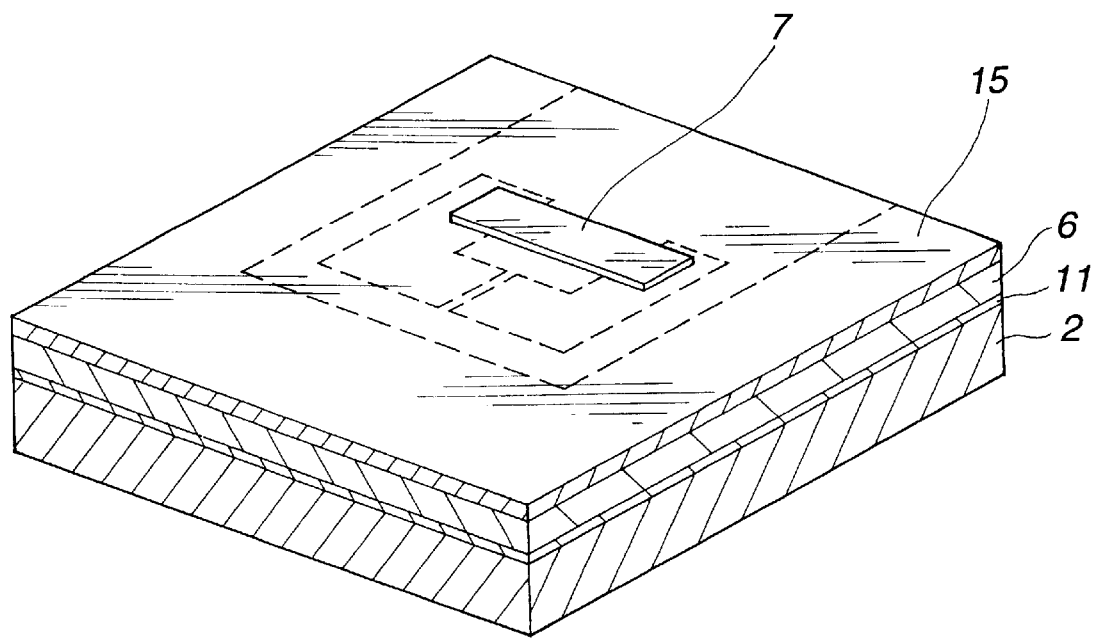
FIG. 20 is a perspective view explaining the method of manufacturing the MR head according to the embodiment 1, wherein a magnetic resistance effect element is formed on the insulating film.

Next, as shown in FIG. 20, a magnetic resistance effect element 7 is formed on the insulating film 15.

More specifically, to form the magnetic resistance effect element 7, a mask is formed by use of a photoresist on the insulating film 15. The mask may include an opening portion adjacent to the magnetic resistance effect element 7 so that the mask and the opening may be part of an entire surface. Then, a thin film may be formed on the entire surface It is this thin film that eventually may be converted into the magnetic resistance effect element 7. For the purpose of explanation and to distinguish it from the photoresist mask, this thin film may be referred to as a magnetic resistance effect element thin film.

For example, the magnetic resistance effect element thin film is formed by sequentially forming films of Ta, NiFeNb, Ta, NiFe, and Ta in this order. In this case, NiFe forms the magnetic resistance effect film and serves as the magnetic sensing portion of the MR head element 3. Also, NiFeNb forms a soft magnetic film (so-called a SAL film) for applying a bias magnetic field to the magnetic resistance effect film. Note that materials of the magnetic resistance effect element 7 are not limited to those of the above example but appropriate materials may be used in accordance with requirements of the system.

At last, the photoresist is peeled together with the magnetic resistance effect element thin film formed on the photoresist. As a result, as shown in FIG. 20, the magnetic resistance effect element 7 is formed on the insulating film 15.

Figure 21:
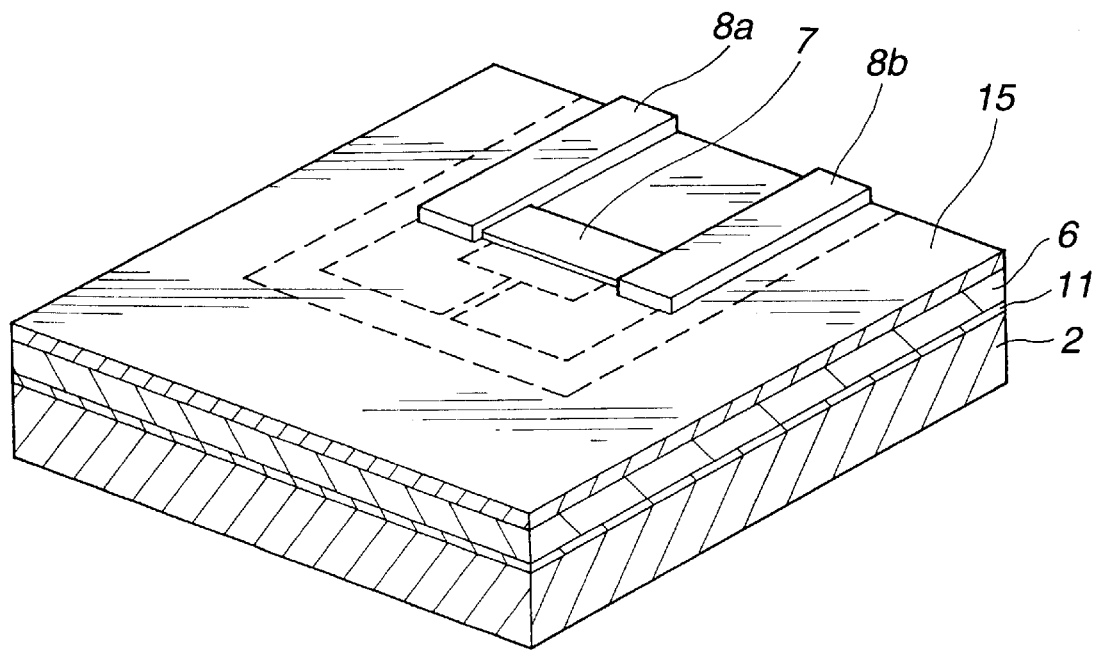
FIG. 21 is a perspective view explaining the method of manufacturing the MR head according to the embodiment 1, wherein first lead conductors are formed on the insulating film.

Next, as shown in FIG. 21, first lead conductors 8a and 8b are formed for supplying a sensing current to the magnetic resistance effect element 7.

More specifically, to form the fist lead conductors 8a and 8b, a mask having opening portions at the portions which form the first lead conductors 8a and 8b is formed on the insulating film 15 and the magnetic resistance effect element 7. Next, a conductive film which forms the first lead conductors 8a and 8b is formed on the entire surface.

At last, the photoresist is peeled together with the conductive film formed on the photoresist. As a result, as shown in FIG. 21, first lead conductors 8a and 8b are formed at both end portions of the magnetic resistance effect element 7.

Figure 22:
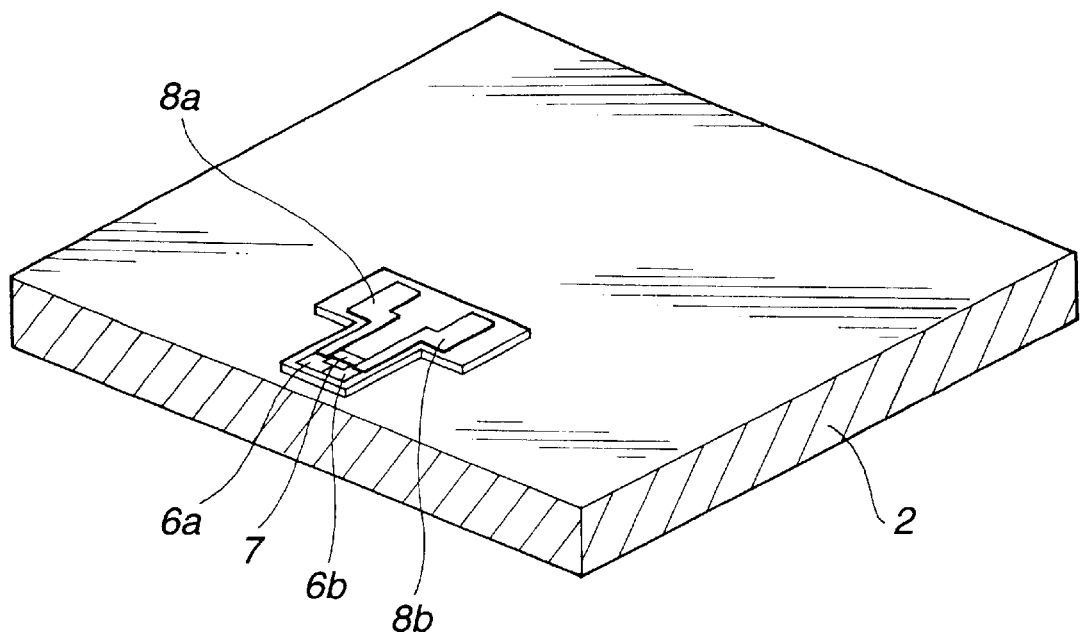
FIG. 22 is a perspective view explaining the method of manufacturing the MR head according to the embodiment 1, wherein the other portions of the magnetic film than the portion which forms the MR head element are removed.

Next, as shown in FIG. 22, the other portions of the magnetic film than those portions thereof that will form the yoke cores 6a and 6b are removed from the magnetic film 6 formed on the first Cr film 11.

Figure 23:
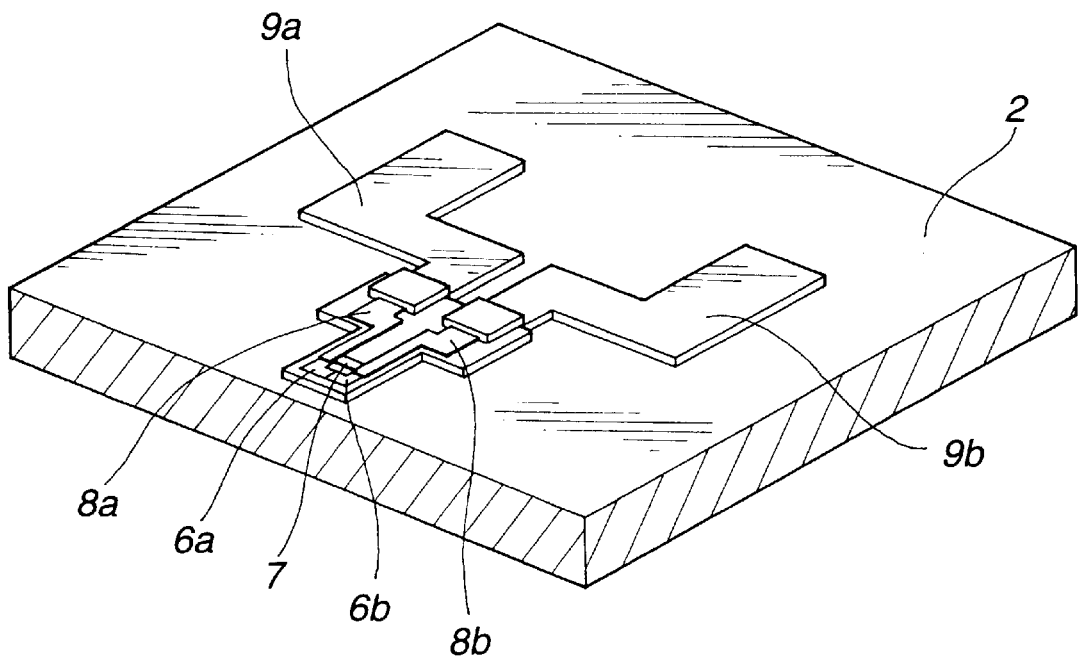
FIG. 23 is a perspective view explaining the method of manufacturing the MR head according to the embodiment 1, wherein second lead conductors are formed at end portions of the first lead conductors.

Next, as shown in FIG. 23, second lead conductors 9a and 9b are formed on end portions of the first lead conductors 8a and 8b.

More specifically, for example, a mask having opening portions at those portions where the second lead conductors 9a and 9a are formed is formed of a photoresist at first, so that the end portions of the first lead conductors 8a and 8b opposite to the end portions connected to the magnetic resistance effect element 7 are exposed. Next, with the mask of the photoresist kept remaining, a conductive film is formed thereon. As this conductive film, a conductive film made of Cu is formed by electrolytic plating with use of a copper sulfate solution. Note that any other method than the electrolytic plating may be used as the method of forming this conductive film as long as the method does not influence other films. Thereafter, the photoresist forming the mask is removed together with the conductive film formed on the photoresist. As a result, as shown in FIG. 23, second lead conductors 9a and 9b are formed at end portions of the first lead conductors.

Figure 24:
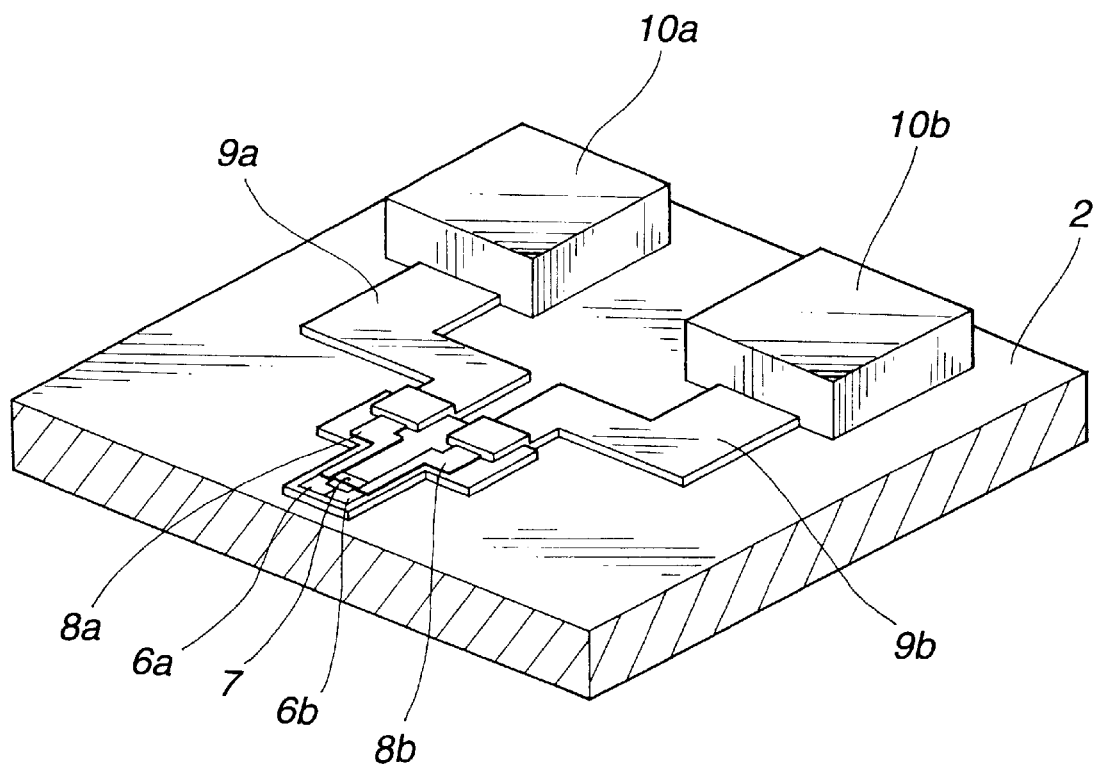
FIG. 24 is a perspective view explaining the method of manufacturing the MR head according to the embodiment 1, wherein external terminals are formed at end portions of the second lead conductors.

Next, with use of a photolithography technique, external terminals 10a and 10b for making connection to external circuits are formed on the second lead conductors 9a and 9b, as shown in FIG. 24.

More specifically, for example, a mask having opening portions at those portions where the external terminals 10a and 10b are to be formed is formed of a photoresist at first, so that the end portions of the second lead conductors 9a and 9b opposite to the end portions connected to the first lead conductors 8a and 8b are exposed. Next, with the mask of the photoresist kept remaining, a conductive film is formed thereon. As this conductive film, a conductive film made of Cu is formed by electrolytic plating with use of a copper sulfate solution. Note that any other method than the electrolytic plating may be used as the method of forming this conductive film as long as the method does not influence other films. Thereafter, the photoresist forming the mask is removed together with the conductive film formed on the photoresist. As a result, as shown in FIG. 24, external terminals 10a and 10b are formed at end portions of the second lead conductors 9a and 9b.

Figure 25:
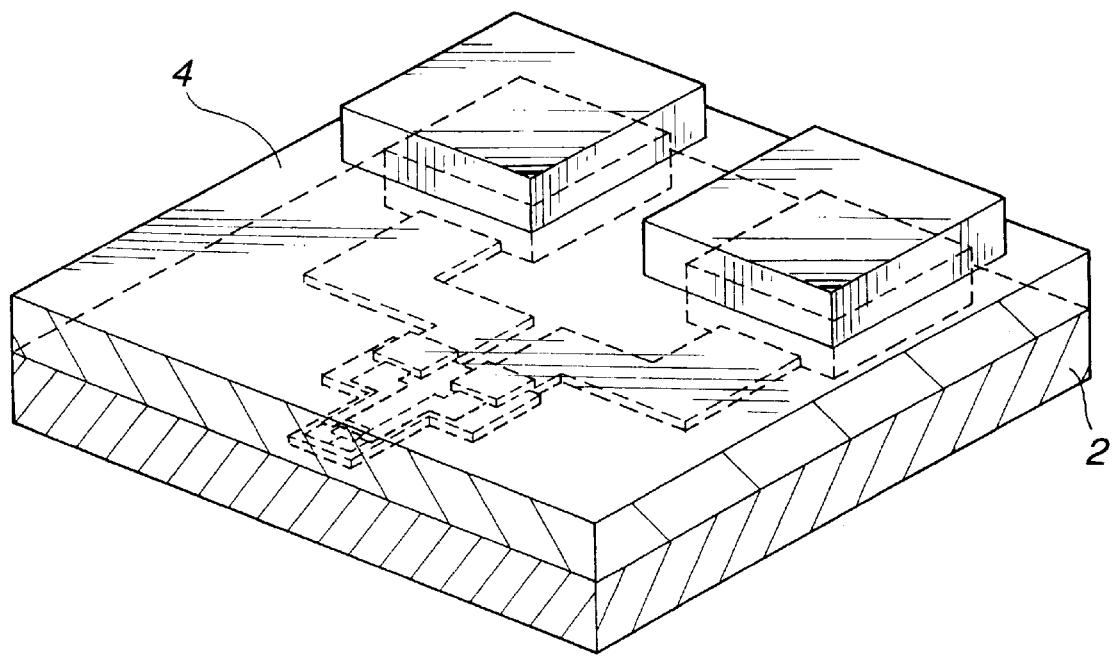
FIG. 25 is a perspective view explaining the method of manufacturing the MR head according to the embodiment 1, wherein a protect film is formed.
Figure 26:
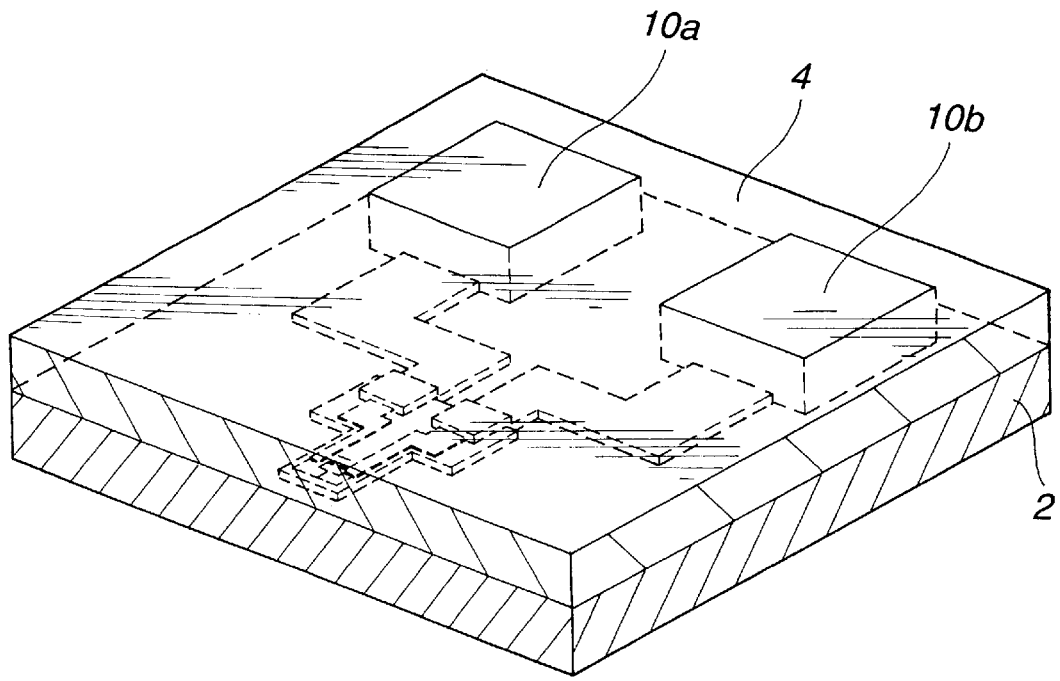
FIG. 26 is a perspective view explaining the method of manufacturing the MR head according to the embodiment 1, wherein the surface of the protect film is flattened to expose the external terminals.

Next, as shown in FIG. 25, a protect film 4 is formed by coating Al2O3 on the entire surface. Further, as shown in FIG. 26, the surface of the protect film 4 is mechanically polished to flatten the surface of the protect film 4 and to simultaneously expose the external terminals 10a and 10b from the protect film 4.

Figure 27:
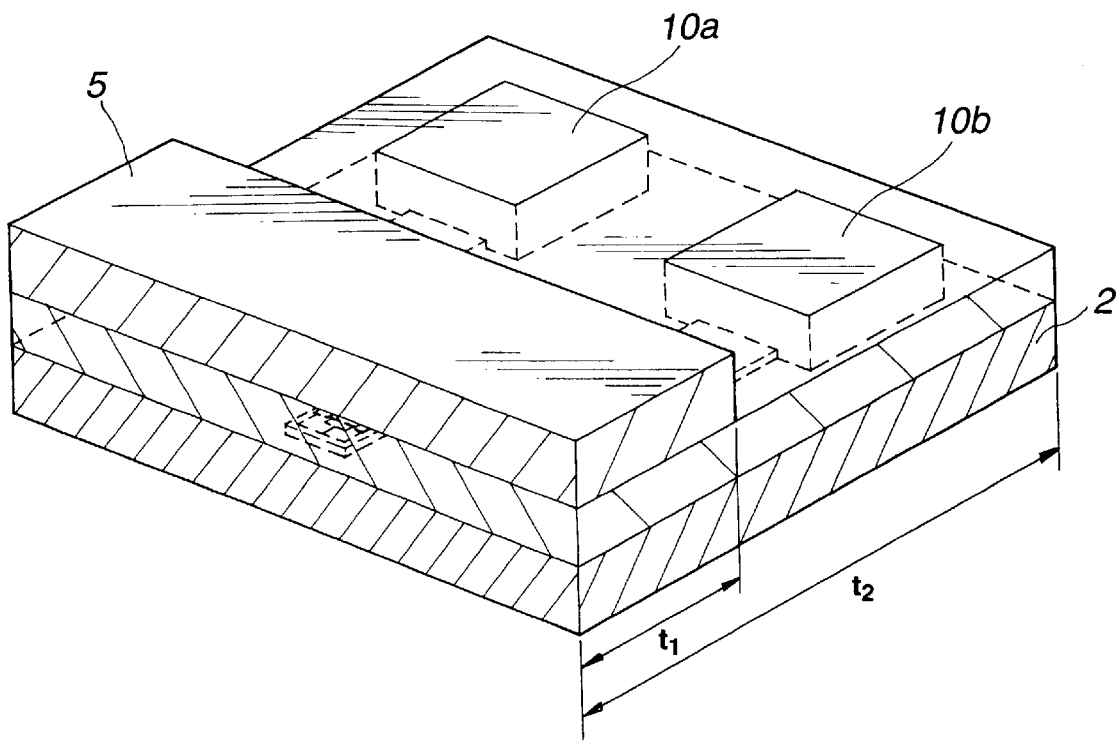
FIG. 27 is a perspective view explaining the method of manufacturing the MR head according to the embodiment 1, wherein a second substrate is adhered on the first substrate.

Next, as shown in FIG. 27, a second substrate 5 which serves as a guard material is adhered on the first substrate 2 where the MR head element 3 is formed. For example, an adhesion such as a resin or the like is used to adhere the second substrate 5. At this time, the length t1 of the second substrate 2 is set to be shorter than the length t2 of the first substrate 2, and the external terminals 10a and 10b of the MR head element 3 are exposed so that connection is made to the external terminals 10a and 10b. In addition, a hard material having high resistivity is used for the second substrate 5. For example, calcium titanate is used as the hard material used for the second substrate 5.

Figure 28:
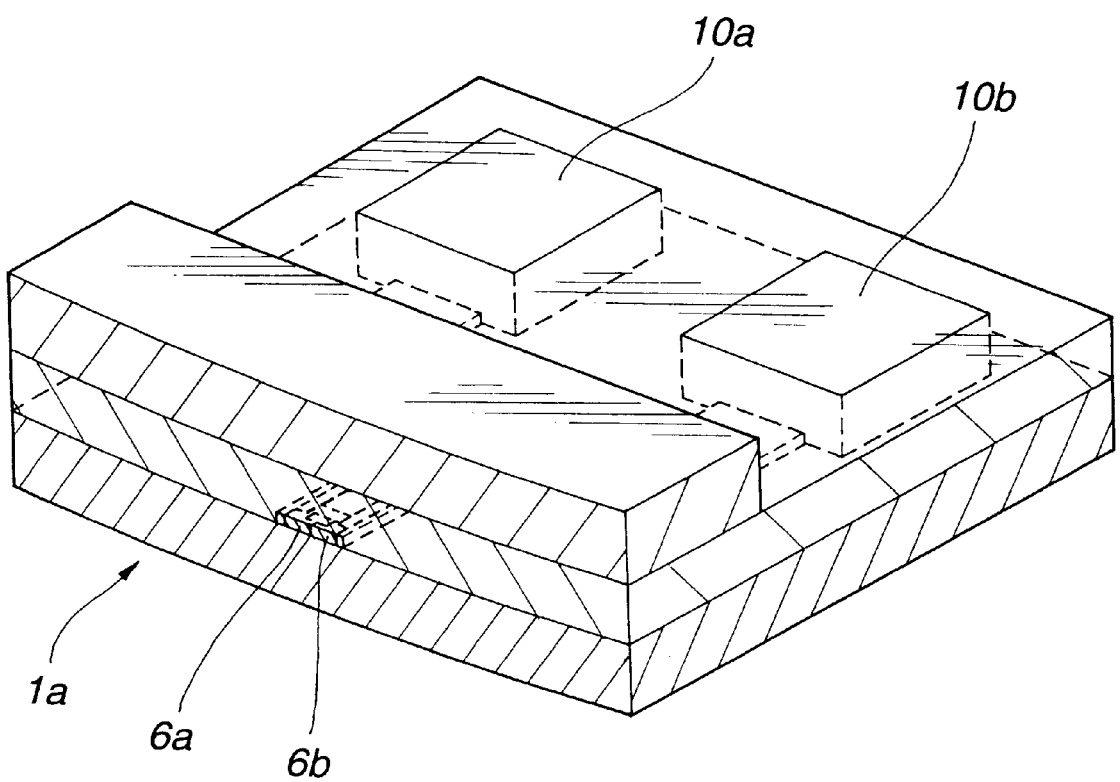
FIG. 28 is a perspective view explaining the method of manufacturing the MR head according to the embodiment 1, wherein the surface as a sliding surface which slides on a magnetic recording medium is polished.

At last, as shown in FIG. 28, the surface 1a as the sliding surface on which the magnetic recording medium slides is polished until the end portions of the yoke cores 6a and 6b are exposed.

By carrying out the above steps, the MR head 1 as shown in FIG. 1 is completed.

Next, a second embodiment of the present invention will be specifically explained with reference to the drawings. Since the steps which correspond to the FIGS. 3 to 6 of the above first embodiment are common to the second embodiment, explanation of those steps will be omitted herefrom.

Prepared at first is the first substrate 2 on which the first Cr film 11, SiO2 film 12, second CR film 13, and electron beam resist 14 as shown in FIGS. 5 and 6 with reference to the first embodiment. Next, an electron beam is irradiated along a predetermined pattern onto the electron beam resist 14, with use of an electron beam exposure device, and drawing is thus achieved, thereby to form a predetermined pattern latent image in the electron beam resist 14. More specifically, an electron beam is irradiated on the portions which form the yoke cores 6a and 6b.

Figure 29:
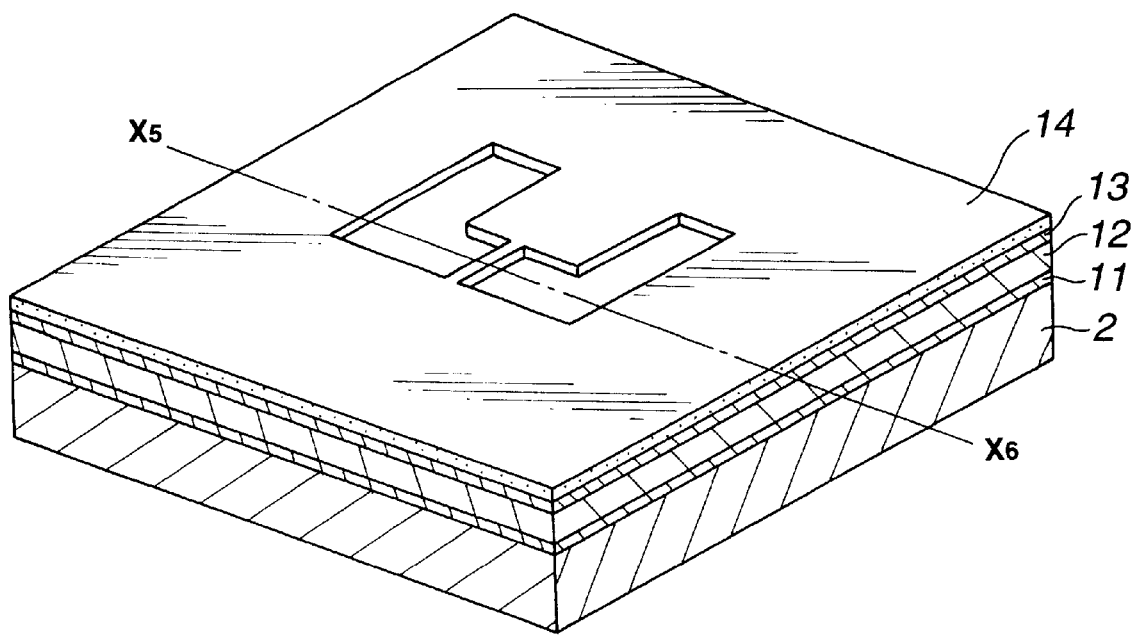
FIG. 29 is a perspective view explaining the method of manufacturing the MR head according to the embodiment 1, wherein the electron beam resist is developed to form a mask pattern.
Figure 30:
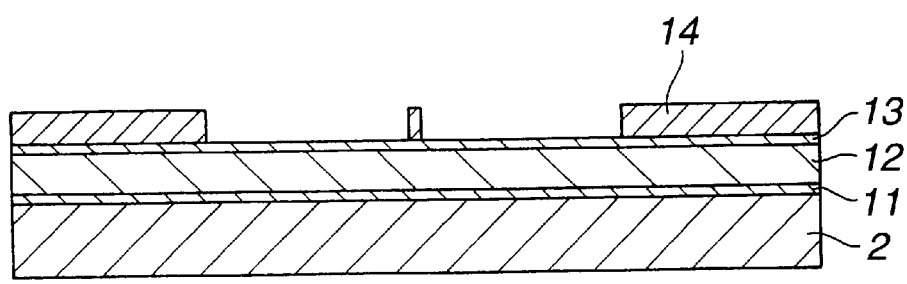
FIG. 30 is a cross-sectional view cut along the line X5–X6 in FIG. 29.

Next, as shown in FIGS. 29 and 30, the electron beam resist 14 in which a pattern latent image is formed is developed, to form a mask pattern. If a positive resist is used as the electron beam resist 14, the portion of the resist where the electron beams has bot been irradiated remains and forms a mask pattern.

Figure 31:
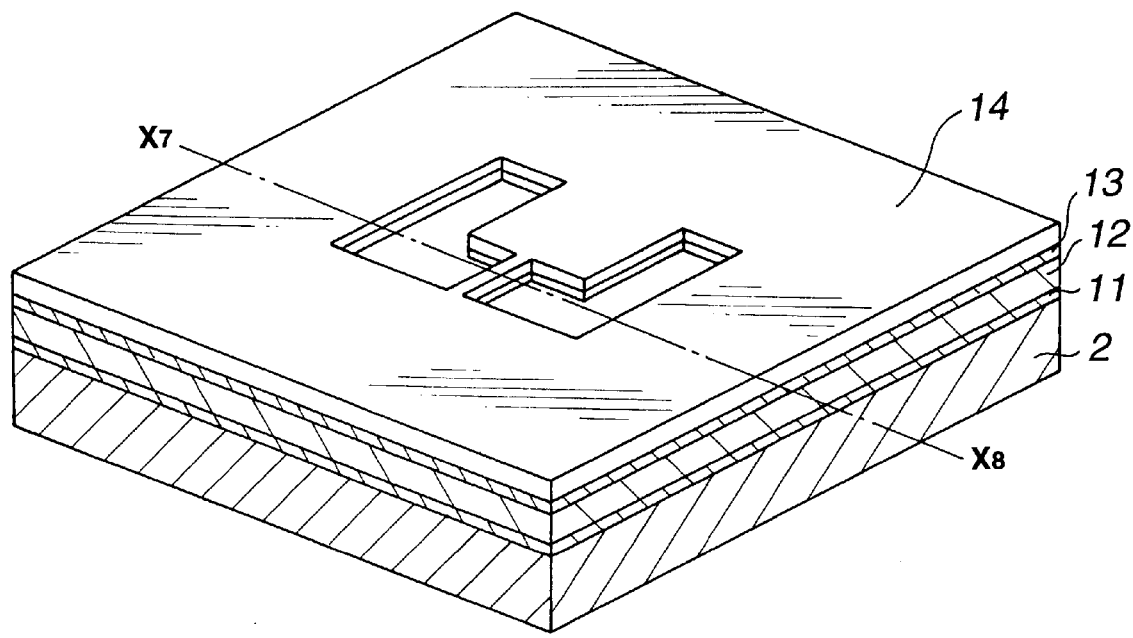
FIG. 31 is a perspective view explaining the method of manufacturing the MR head according to the embodiment 1, wherein the second Cr film is etched with the mask pattern used as a mask.
Figure 32:
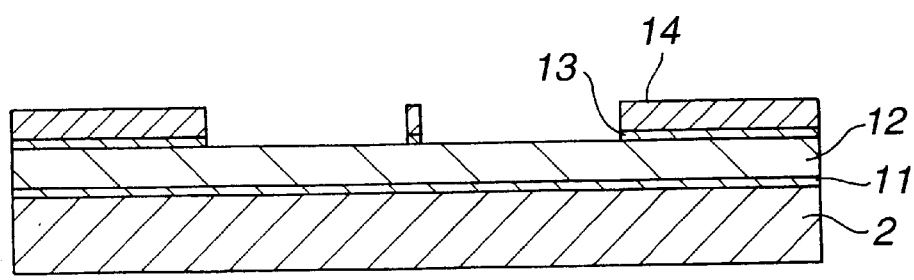
FIG. 32 is a cross-sectional view cut along the line X7–X8 in FIG. 31.

Next, as shown in FIGS. 31 and 32, etching is carried out using the mask pattern formed as described above as a mask, thereby to remove the second Cr film 13 exposed from the mask pattern. The etching is, for example, ion etching.

Figure 33:
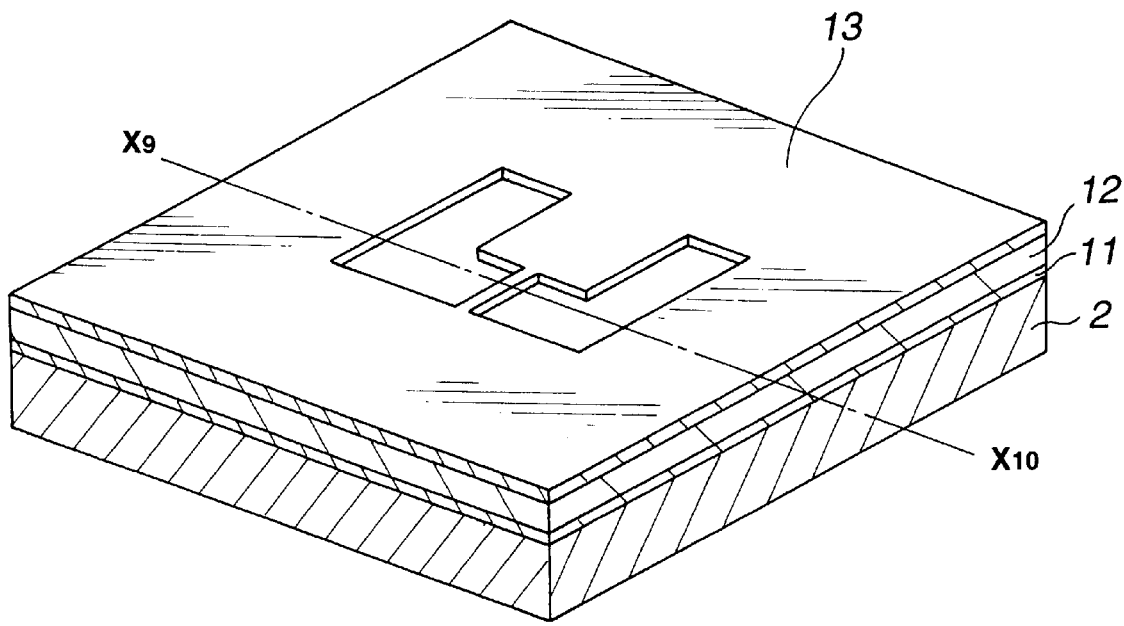
FIG. 33 is a perspective view explaining the method of manufacturing the MR head according to the embodiment 1, wherein the second Cr film is patterned into a predetermined shape.
Figure 34:
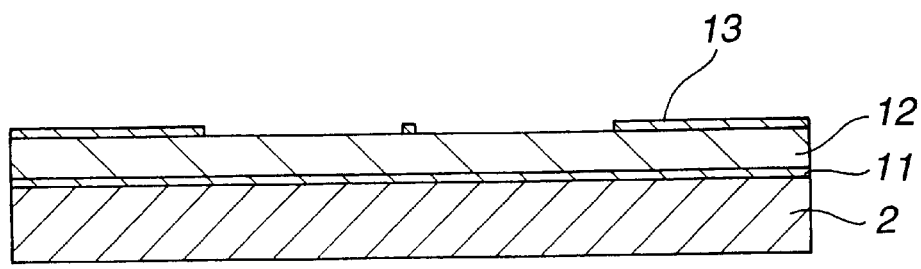
FIG. 34 is a cross-sectional view cut along the line X9–X10 in FIG. 33.

At last, the electron beam resist 14 is removed. As a result, as shown in FIGS. 33 and 34, a second Cr film 13 patterned into a predetermined shape is obtained. More specifically, this pattern has opening portions at the portions where yoke cores 6a and 6b. At this time, those portions for forming the yoke cores 6a and 6b that are opposed to each other constitute a magnetic gap g, which has a width of about 0.2 m, for example. In addition, the electron beam resist 14 needs not always be peeled at this time point. If not peeled at this point, reactive ion etching which will be described later is carried out, and thereafter, the resist 14 may be peeled together with a novolak-resin-based resist which will also be described later.

Figure 35:
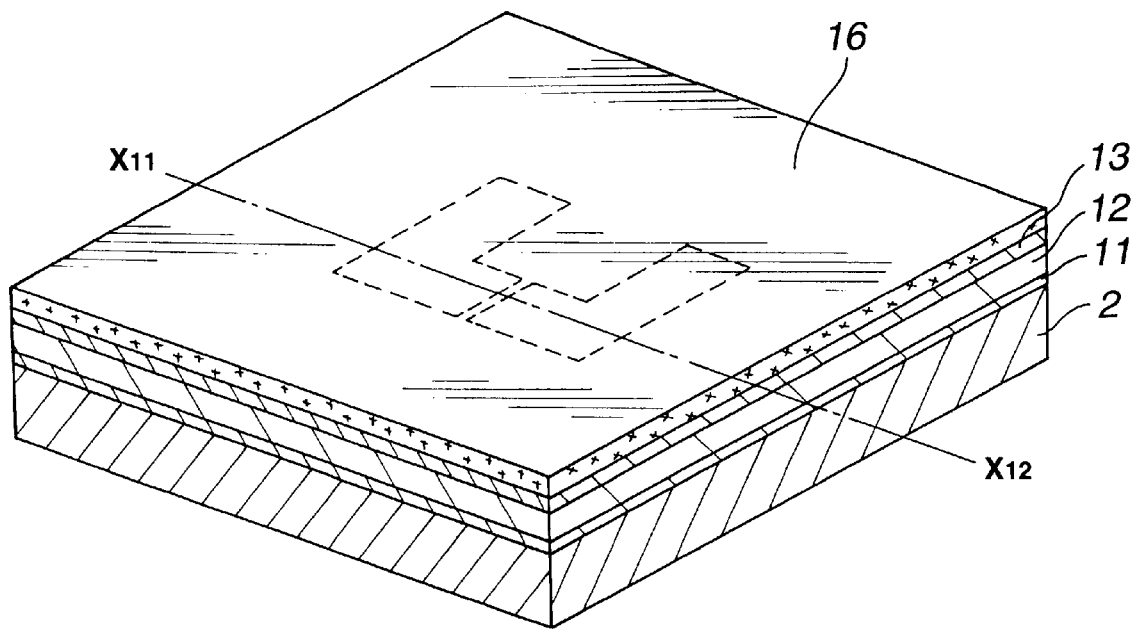
FIG. 35 is a perspective view explaining the method of manufacturing the MR head according to the embodiment 1, wherein a novolak-resin-based resist is applied onto the second Cr film patterned into a predetermined shape.
Figure 36:
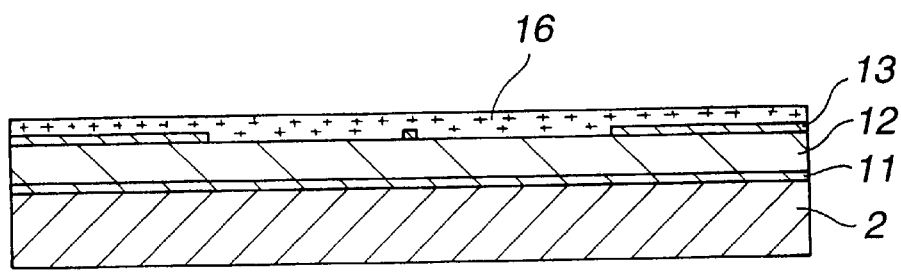
FIG. 36 is a cross-sectional view cut along the line X11–X12 in FIG. 35.

Next, as shown in FIGS. 35 and 36, a novolak-resin-based resist 16 is applied onto the second Cr film 13 thus patterned into a predetermined shape, thereby to obtain a film with thickness of about 4 to 5 m which is about twice thicker than the SiO2 film.

This novolak-resin-based resist 16 functions as a positive type resist whose solubility with respect a developing solution increases at the portions irradiated with the electron beam. For example, AZ-4400 (commercial name) manufactured by Hoechst AG or the like which is a novolak-resin-based g-ray resist, or the like. In addition, it is preferable that the novolak-resin-based resist 16 is subjected to pre-baking before exposure. By thus carrying out pre-baking, the novolak-resin-based resist 16 improves its sensitivity during exposure and a fine pattern can be formed with high accuracy.

Next, a g-ray used as an exposure light source is irradiated along a predetermined pattern onto the novolak-resin-based resist 16 to achieve drawing, and thus, a predetermined pattern latent image is formed in the novolak-resin-based resist 16, i.e., a pattern latent image for hiding portions unnecessary for reactive ion etching for forming the yoke cores which will be described later. More specifically, the g-ray is irradiated onto shapes which are larger by 1 to 10 m than the portions to form the yoke cores 6a and 6b.

Figure 37:
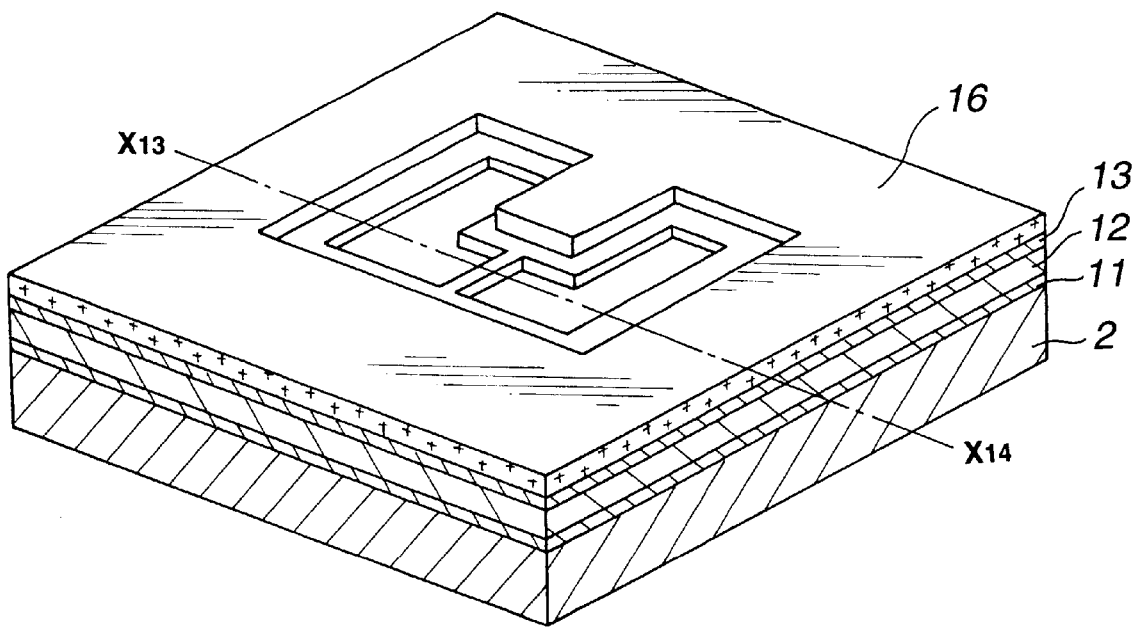
FIG. 37 is a perspective view explaining the method of manufacturing the MR head according to the embodiment 1, wherein the novolak-resin based resist is patterned into a predetermined shape.
Figure 38:
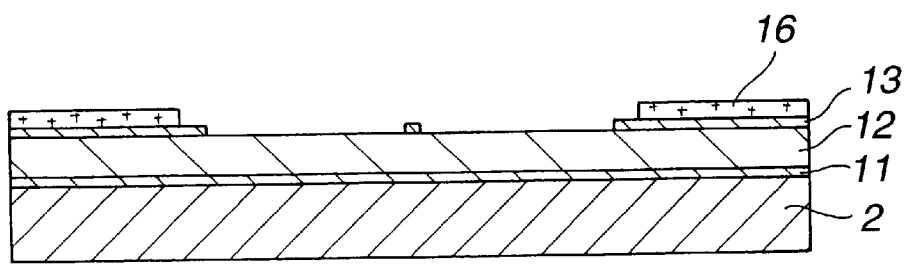
FIG. 38 is a cross-sectional view cut along the line X13–X14 in FIG. 37.

Next, as shown in FIGS. 37 and 38, the novolak-resin-based resist 16 in which a pattern latent image is formed is developed to form a mask pattern. Those portions of the novolak-resin-based resist 16 that have not been irradiated with the g-ray remain thereby forming a mask pattern.

Figure 39:
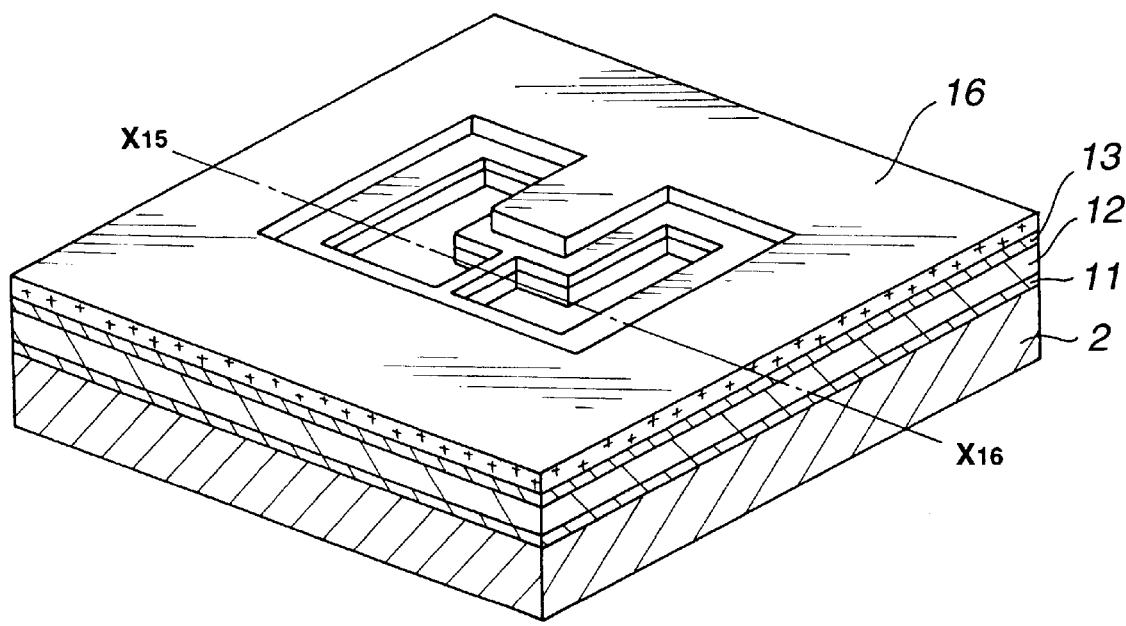
FIG. 39 is a perspective view explaining the method of manufacturing the MR head according to the embodiment 1, wherein the SiO2 film is etched with the second Cr film and the novolak-resin-based resist used as masks.
Figure 40:
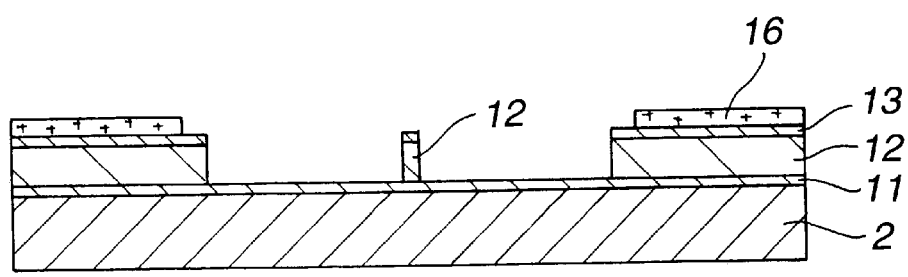
FIG. 40 is a cross-sectional view cut along the line X15–X16 in FIG. 39.

Next, as shown in FIGS. 39 and 40, etching is carried out while the second Cr film 13 and the novolak-resin-based resist 16 thus patterned are used as mask, thereby to remove the SiO2 film exposed from the mask. This etching is reactive ion etching.

The gas used for the etching is of a kind which is difficult to create polymerized materials on the surface of the SiO2 film through reaction between the Cr film and the etching gas itself. For example, the gas may be CF4 or a mixed gas of CF4 and oxygen in cases. In addition, to prevent increase of the temperature at the substrate surface, the etching power is set to low power. For example, the power is preferably about 300 to 500W (where a reactive ion etching device DEA 506 (commercial name) manufactured by ANELVA CO., LTD is used). The etching time is set to be longer by about 10% to 20% than the time required for etching the SiO2 film 12. At this time, if the etching time is long, the etching stops due to the first Cr film 11, and therefore, the first substrate 2 is not etched but excellent surface roughness of the substrate can be maintained. For example, the etching time is preferably about 80 to 100 minutes (where a reactive ion etching device DEA 506 (commercial name) manufactured by ANELVA CO., LTD is used with 300W).

The Cr which forms the mask for etching the SiO2 film 12 is a material which has about 40 or more times higher selectivity with respect to reactive ion etching than SiO2. By thus using a mask made of a material having about 40 or more times higher selectivity with respect to reactive ion etching than SiO2, a non-magnetic film for forming a magnetic gap g can be formed with high accuracy. Metal materials of this kind are, for example, NeFe, CoZrNb, and the like in addition to Cr. The selectivity with respect to reactive ion etching is set to be 40 or more times higher because a desired shape and a desired etching amount can be obtained through etching without changing the shape and pattern of the mask until the etching is finished, by using a material having such high selectivity as a mask. In addition, by using a mask thus having high selectivity with respect to reactive ion etching, the thickness of the mask can be reduced so that the cost can be reduced and the production period can be shortened. Also, the novolak-resin-based resist is patterned into shapes which are larger by 1 to 10 m than the portions for forming the yoke cores 6a and 6b. That is, patterning is performed so as to hide portions which are unnecessary for reactive ion etching for forming the yoke cores. In this manner, the contact area between the Cr mask and the etching gas becomes so small that polymerized materials which obstruct etching are prevented from being generated due to reaction between the Cr mask and the etching gas. As a result, SiO2 is etched vertically with respect to the Cr mask forming surface and exactly by a predetermined etching amount.

Figure 41:
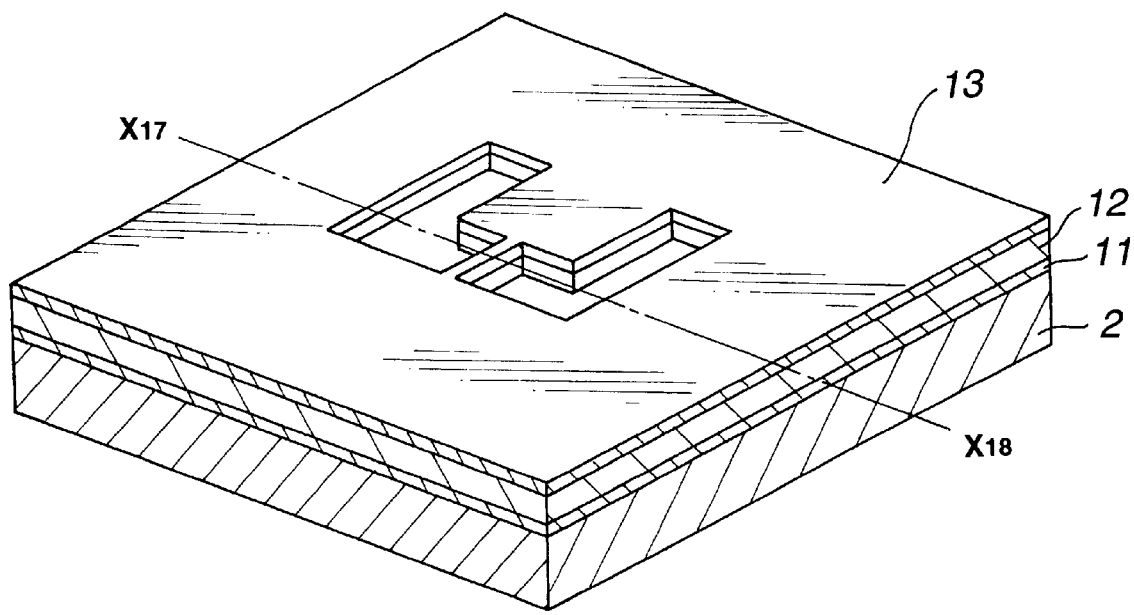
FIG. 41 is a perspective view explaining the method of manufacturing the MR head according to the embodiment 1, wherein the SiO2 film is etched into a predetermined shape.
Figure 42:
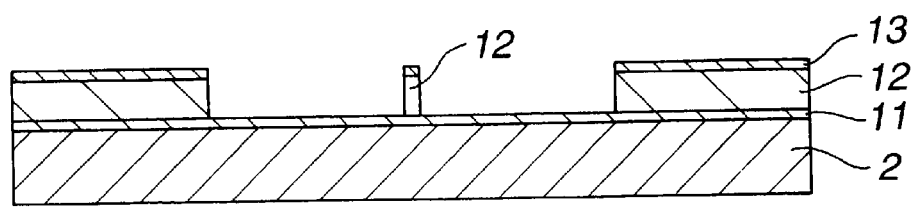
FIG. 42 is a cross-sectional view cut along the line X17–X18 in FIG. 41.

At last, the novolak-resin-based resist 16 is peeled. As a result, those portions of the SiO2 film 12 that correspond to the yoke cores 6a and 6b are removed, as shown in FIGS. 41 and 42.

Note that the novolak-resin-based resist 16 needs not always be peeled at this time point. If it is not peeled at this point, the resist may be peeled when mechanically polishing a magnetic film after a magnetic film which will be described later is coated by sputtering.

Figure 43:
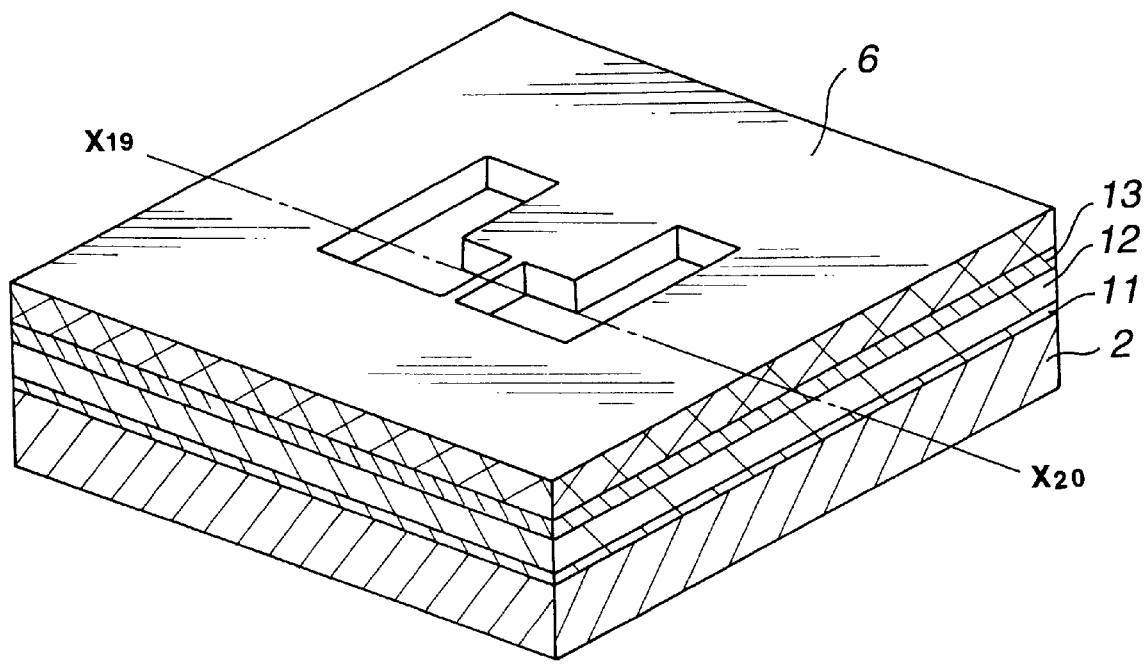
FIG. 43 is a perspective view showing the method of manufacturing the MR head according to the second embodiment, wherein a magnetic film is formed on the entire surface.
Figure 44:
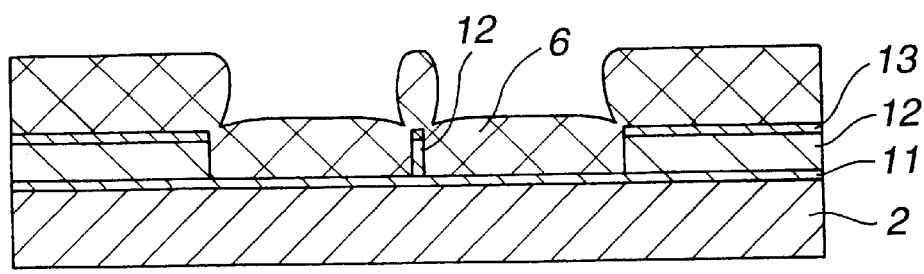
FIG. 44 is a cross-sectional view cut along the line X19–X20 in FIG. 43.

Next, as shown in FIGS. 43 and 44, a magnetic material is coated on the entire surface by sputtering, to form a magnetic film 6 which forms the yoke cores 6a and 6b. At this time, the sputtering is preferably collimation sputtering which uses a parallel plate, like in the first embodiment.

Figure 45:
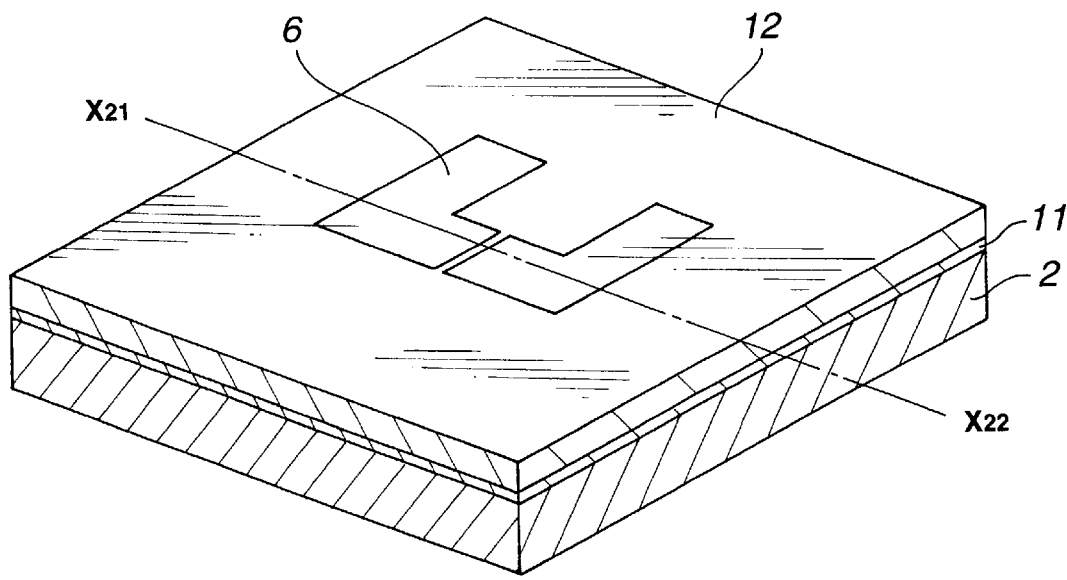
FIG. 45 is a perspective view showing the method of manufacturing the MR head according to the second embodiment, wherein the surface of the magnetic film is polished.
Figure 46:
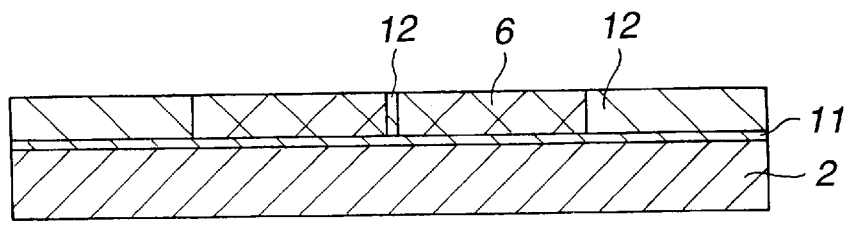
FIG. 46 is a cross-sectional view cut along the line X21–X22 in FIG. 45.

Next, as shown in FIGS. 45 and 46, the entire surface of this magnetic film 6 is polished. As a result, those portions that finally form the yoke cores 6a and 6b are buried in the SiO2 film 12. In this case, the thickness of the yoke cores 6a and 6b is set to predetermined thickness, e.g., about 2.0 m.

Figure 47:
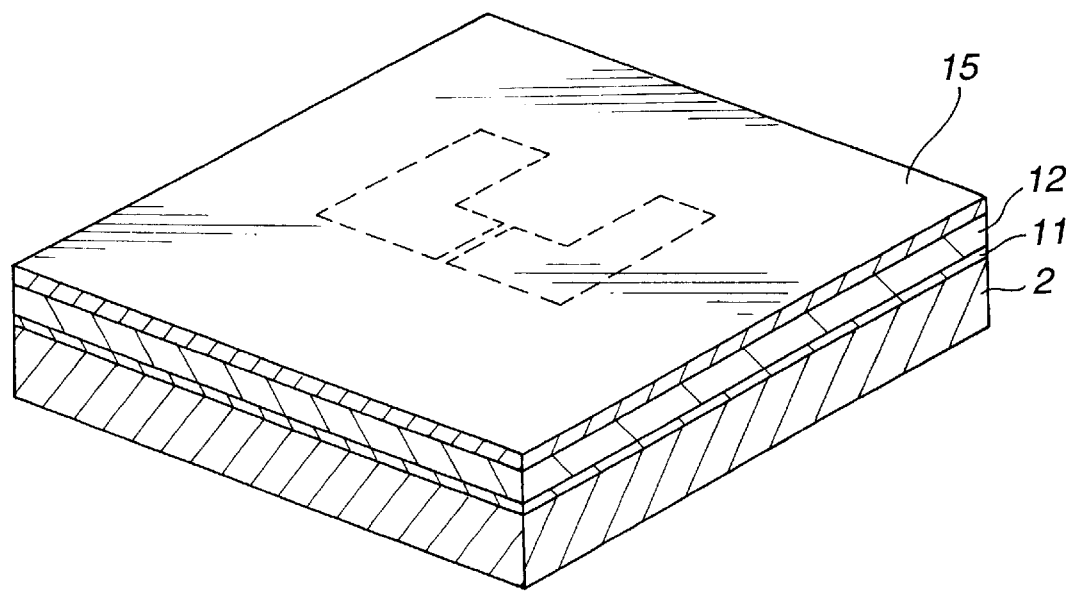
FIG. 47 is a perspective view showing the method of manufacturing the MR head according to the second embodiment, wherein an insulating film is formed.

Next, as shown in FIG. 47, an insulating material is coated on the entire surface by sputtering, to form an insulating film 15, and the surface of this film is buffed. This insulating film 15 makes insulation between the MR element and the yoke cores 6a and 6b. For example, Al2O3 or SiO2 is used for the insulating film.

Figure 48:
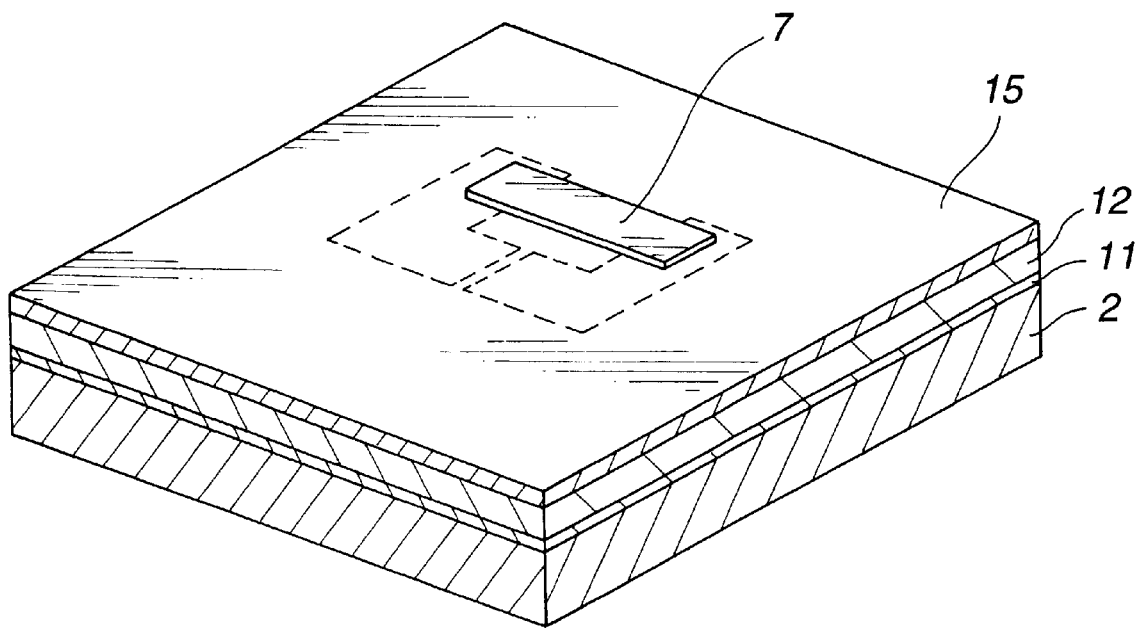
FIG. 48 is a perspective view explaining the method of manufacturing the MR head according to the embodiment 1, wherein a magnetic resistance effect element is formed on the insulating film.

Next, as shown in FIG. 48, a magnetic resistance effect element 7 is formed on the insulating film 15.

Figure 49:
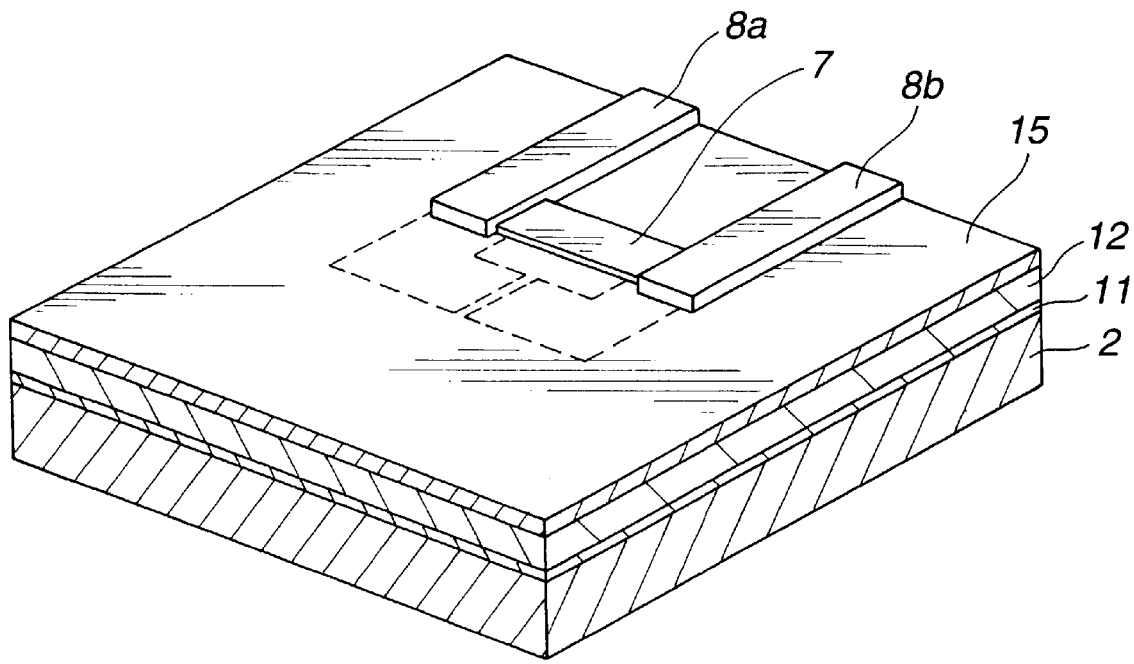
FIG. 49 is a perspective view explaining the method of manufacturing the MR head according to the embodiment 1, wherein first lead conductors are formed on the insulating film.
Figure 50:
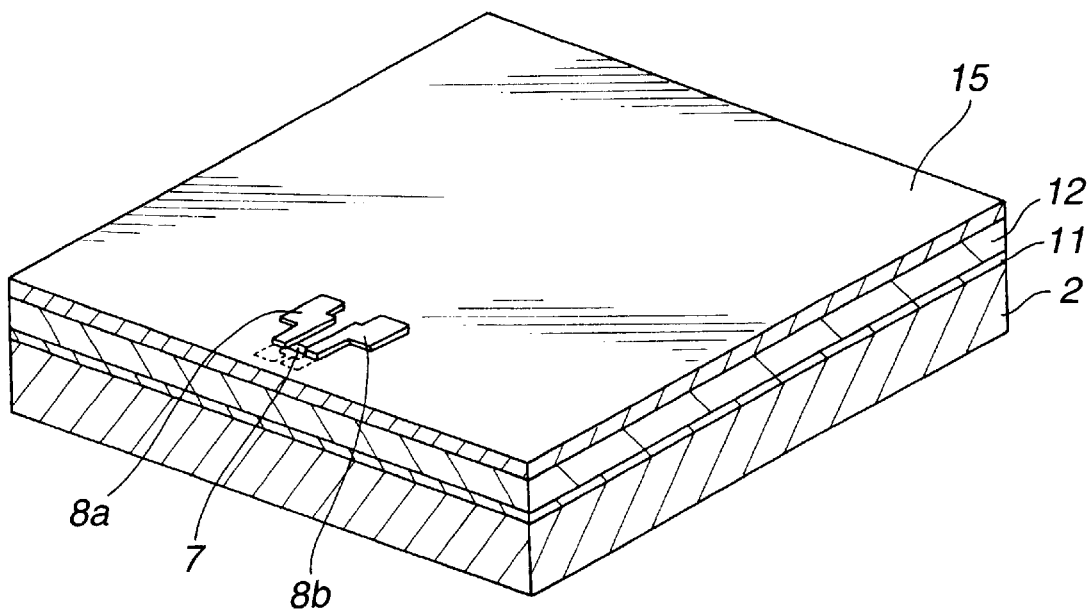
FIG. 50 is a perspective view explaining the method of manufacturing the MR head according to the embodiment 1, wherein first lead conductors are formed on the insulating film.

Next, as shown in FIG. 49 and 50, first lead conductors 8a and 8b are formed for supplying a sensing current to the magnetic resistance effect element 7.

Figure 51:
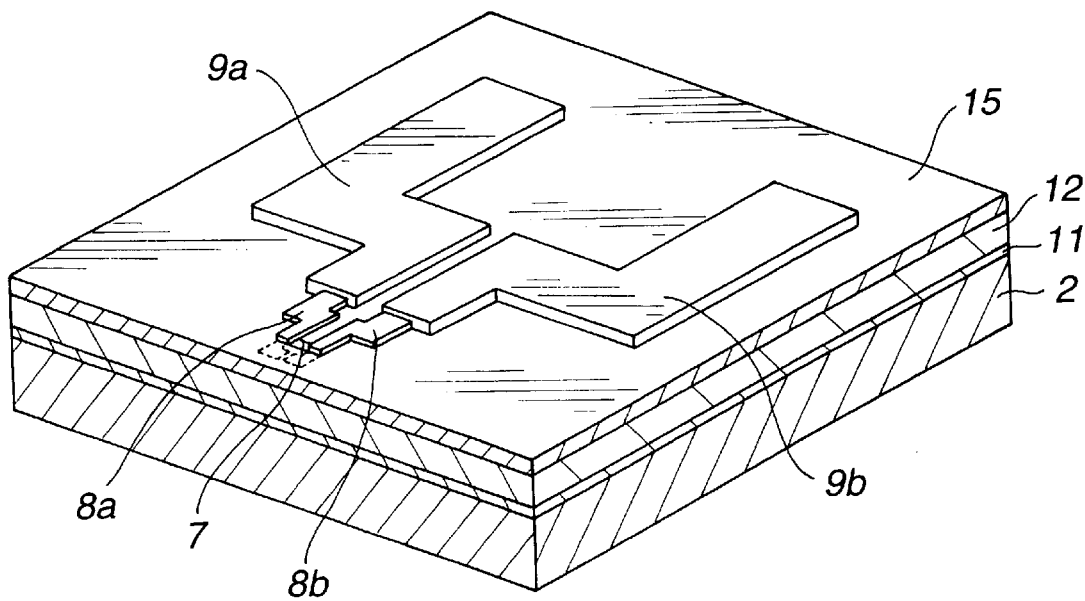
FIG. 51 is a perspective view explaining the method of manufacturing the MR head according to the embodiment 1, wherein second lead conductors are formed at end portions of the first lead conductors.

Next, as shown in FIG. 51, second lead conductors 9a and 9b are formed on end portions of the first lead conductors 8a and 8b.

Next, with a mask of a photoresist kept remaining, a conductive film is formed thereon. Thereafter, the photoresist forming the mask is removed together with the conductive film formed on the photoresist. As a result, as shown in FIG. 51, second lead conductors 9a and 9b are formed at end portions of the first lead conductors.

Figure 52:
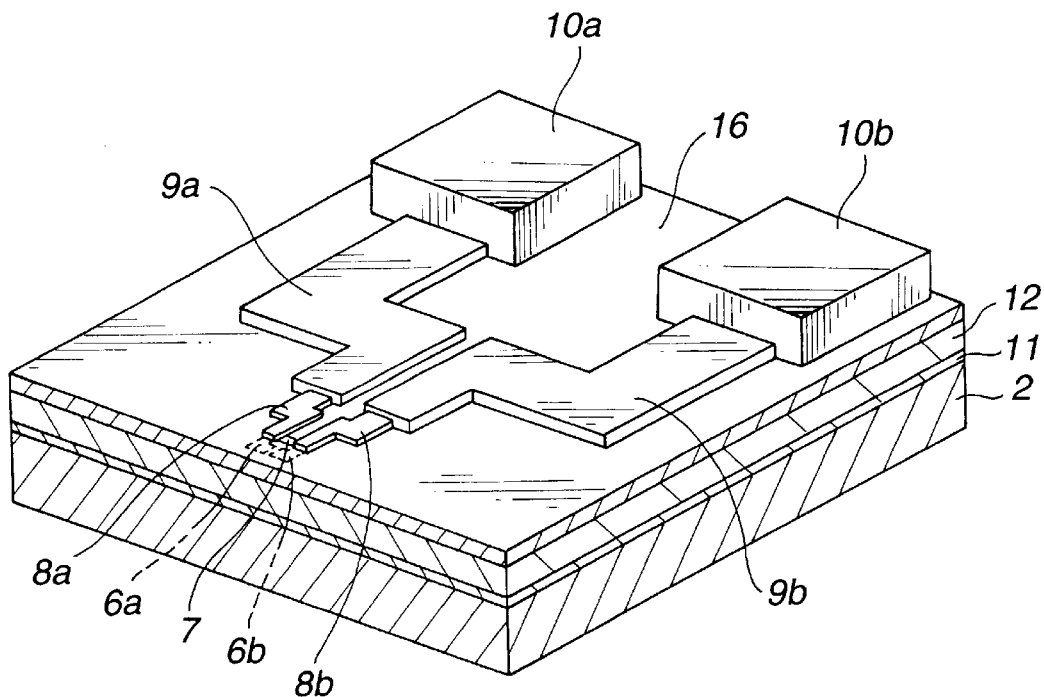
FIG. 52 is a perspective view explaining the method of manufacturing the MR head according to the embodiment 1, wherein external terminals are formed at end portions of the second lead conductors.

Next, with use of a photolithography technique, external terminals 10a and 10b for making connection to external circuits are formed on the second lead conductors 9a and 9b, as shown in FIG. 52.

Next, with a mask of a photoresist kept remaining, a conductive film is formed thereon. Thereafter, the photoresist forming the mask is removed together with the conductive film formed on the photoresist. As a result, as shown in FIG. 52, external terminals 10a and 10b are formed at end portions of the second lead conductors 9a and 9b.

Figure 53:
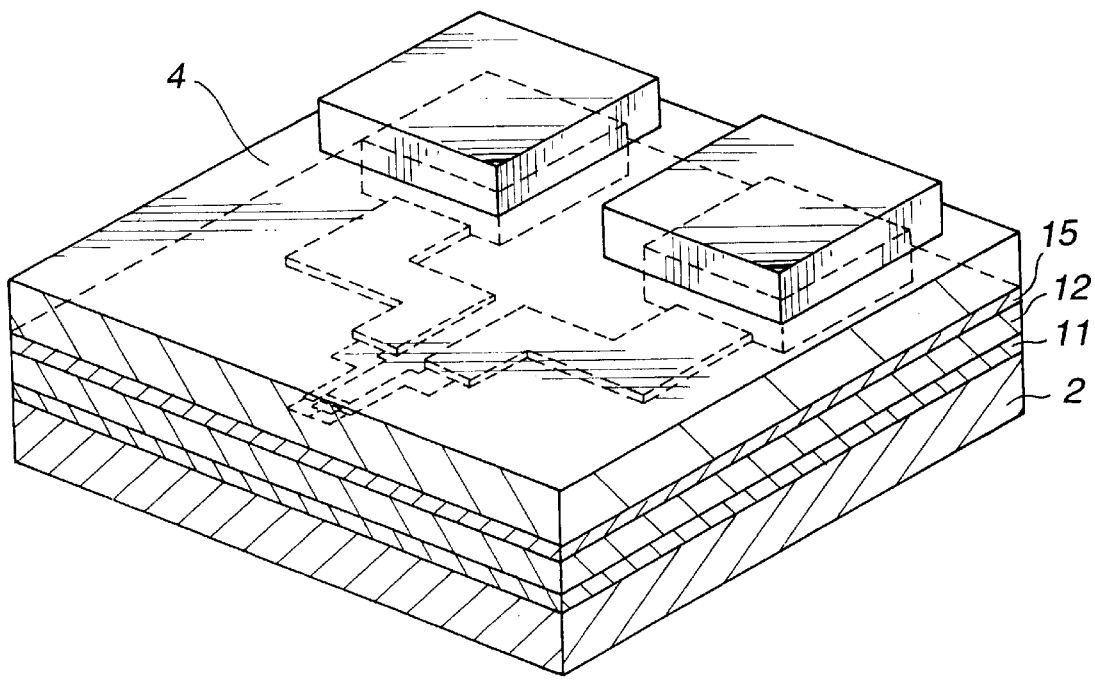
FIG. 53 is a perspective view explaining the method of manufacturing the MR head according to the embodiment 1, wherein a protect film is formed.
Figure 54:
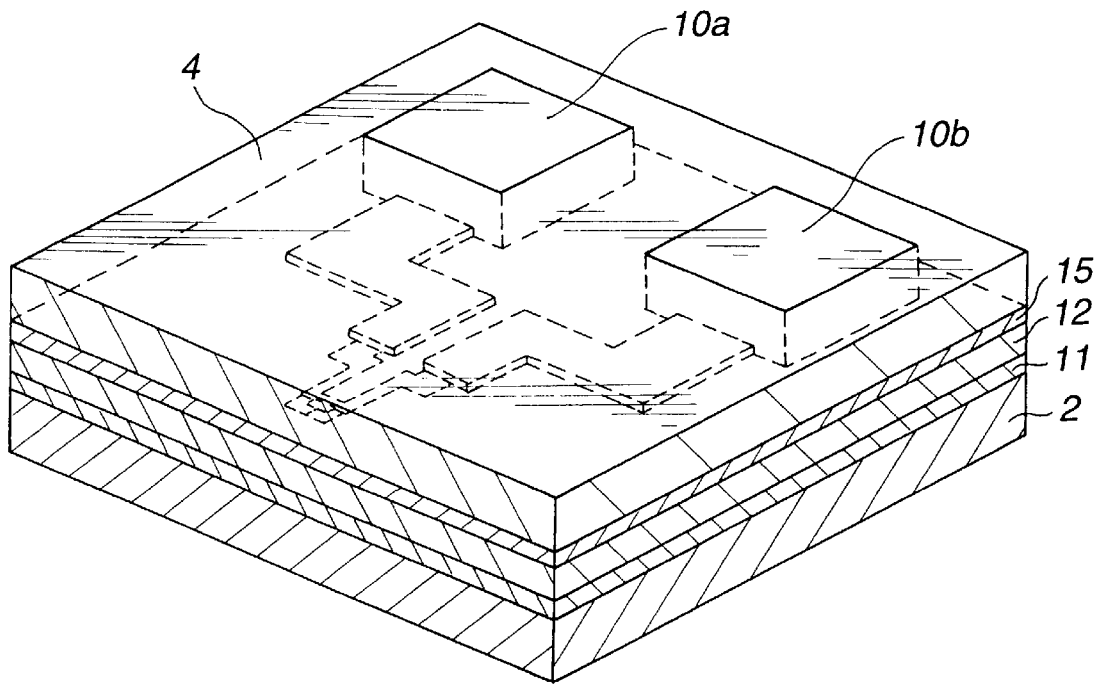
FIG. 54 is a perspective view explaining the method of manufacturing the MR head according to the embodiment 1, wherein the surface of the protect film is flattened to expose the external terminals.

Next, as shown in FIG. 53, a protect film 4 is formed by coating Al2O3 on the entire surface. Further, as shown in FIG. 54, the surface of the protect film 4 is mechanically polished to flatten the surface of the protect film 4 and to simultaneously expose the external terminals 10a and 10b from the protect film 4.

Figure 55:
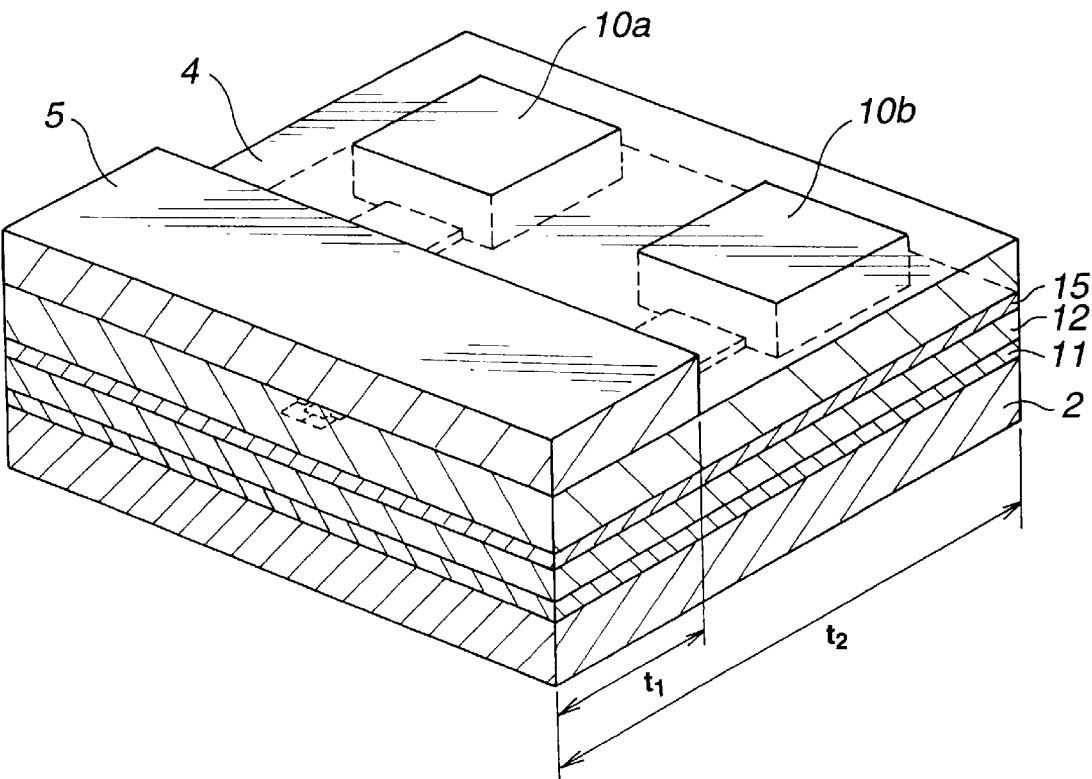
FIG. 55 is a perspective view explaining the method of manufacturing the MR head according to the embodiment 1, wherein a second substrate is adhered on the first substrate.

Next, as shown in FIG. 55, a second substrate 5 which serves as a guard material is adhered on the first substrate 2 where the MR head element 3 is formed.

Figure 56:
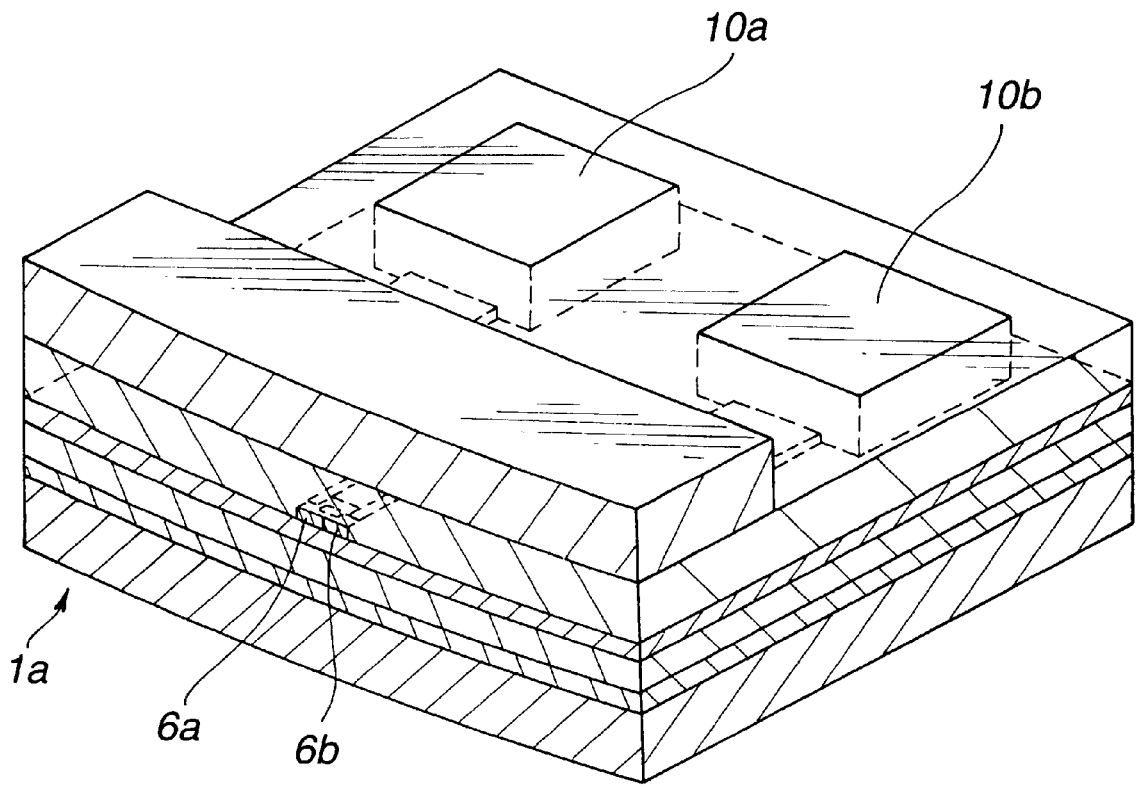
FIG. 56 is a perspective view explaining the method of manufacturing the MR head according to the embodiment 1, wherein the surface as a sliding surface which slides on a magnetic recording medium is polished.
Figure 57:
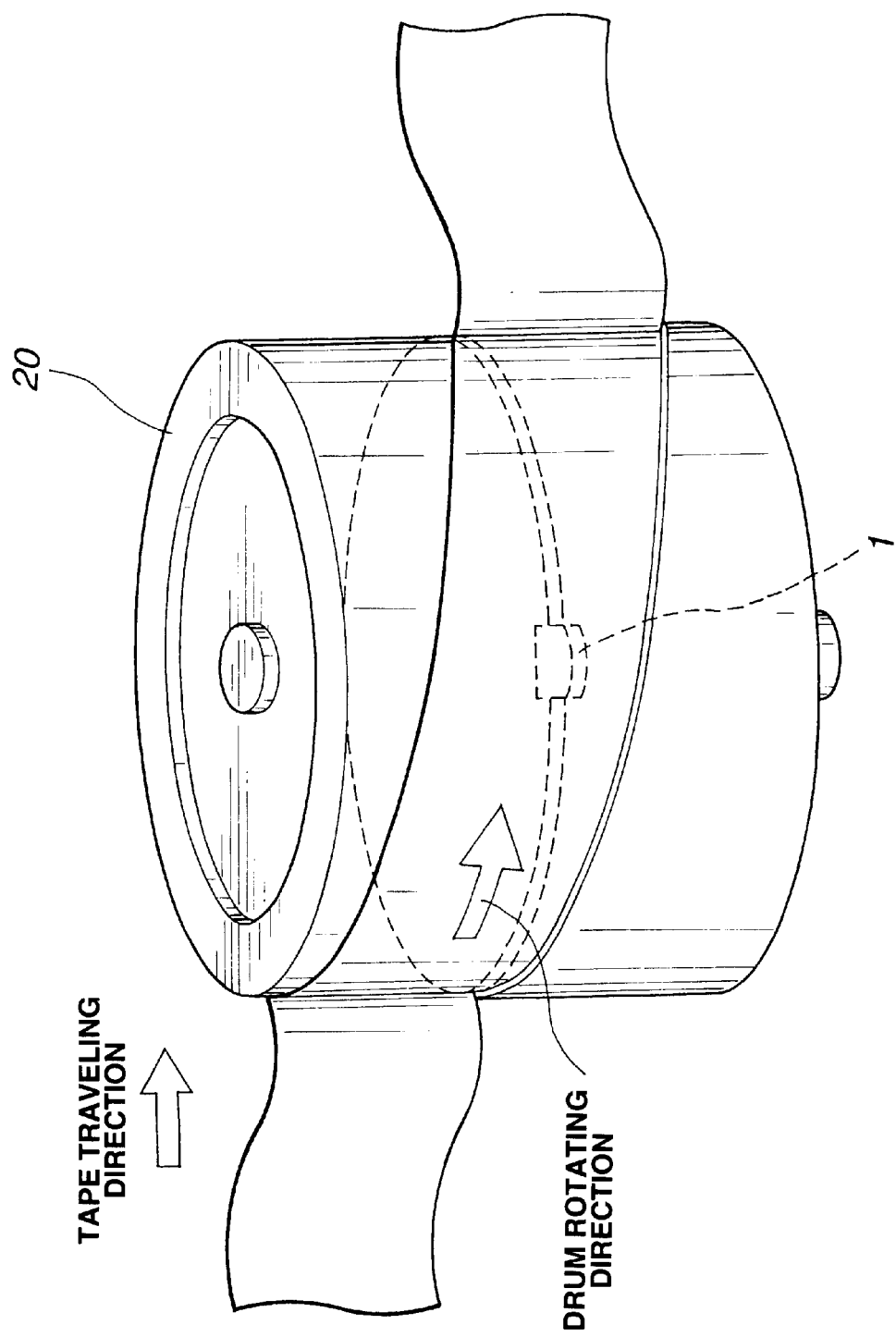
FIG. 57 is a perspective view showing a state where the MR head is mounted on a rotation drum.
Figure 58:
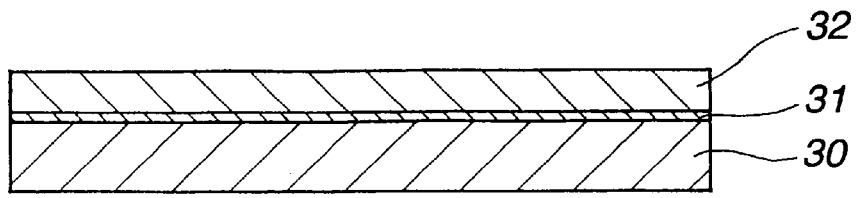
FIG. 58 is a cross-sectional view explaining a first conventional method of forming a magnetic gap, wherein a Cr film and an SiO2 film are formed on a substrate.
Figure 59:
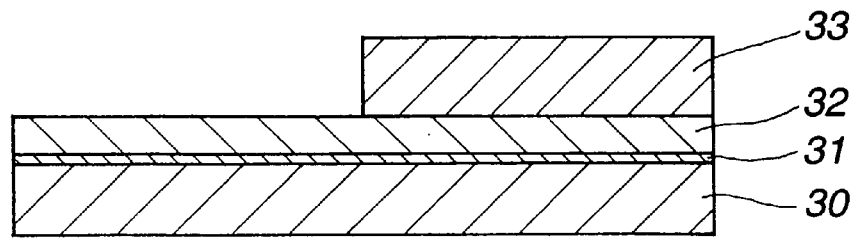
FIG. 59 is a cross-sectional view explaining the first conventional method of forming a magnetic gap, wherein a resist applied on the SiO2 film is patterned into a predetermined shape.
Figure 60:
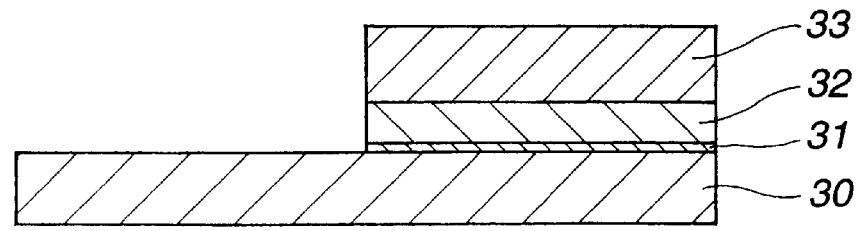
FIG. 60 is a cross-sectional view explaining the first conventional method of forming a magnetic gap, wherein the SiO2 film is etched.
Figure 61:
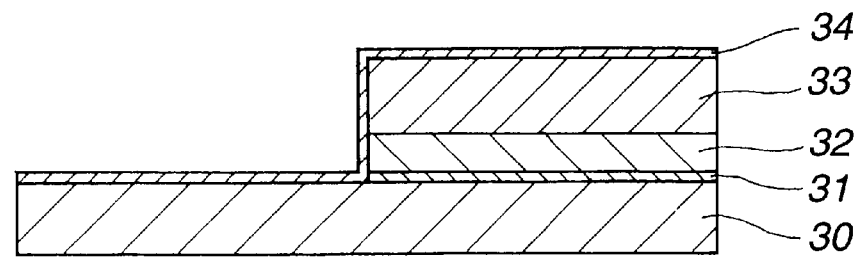
FIG. 61 is a cross-sectional view explaining the first conventional method of forming a magnetic gap, wherein a gap film is formed on the entire surface.
Figure 62:
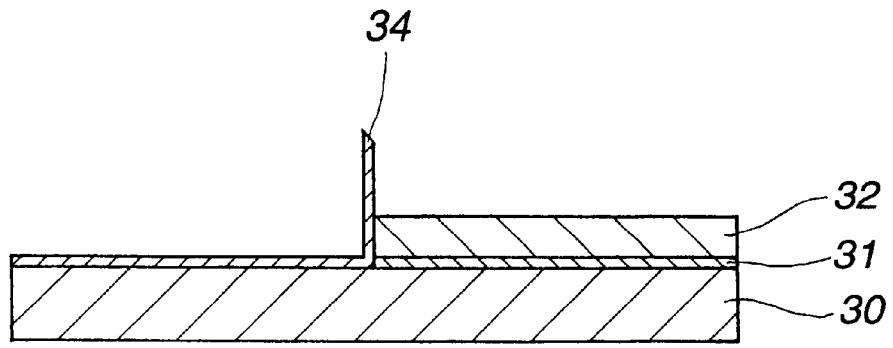
FIG. 62 is a cross-sectional view explaining the first conventional method of forming a magnetic gap, wherein a resist is peeled together with the gap film.
Figure 63:
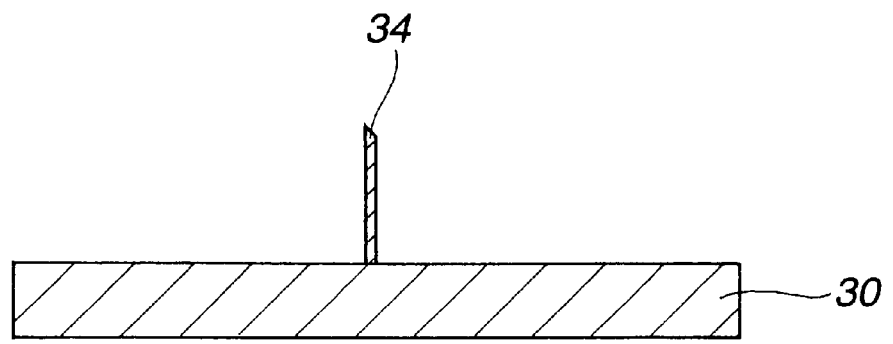
FIG. 63 is a cross-sectional view explaining the first conventional method of forming a magnetic gap, wherein the remaining SiO2 film is removed.
Figure 64:
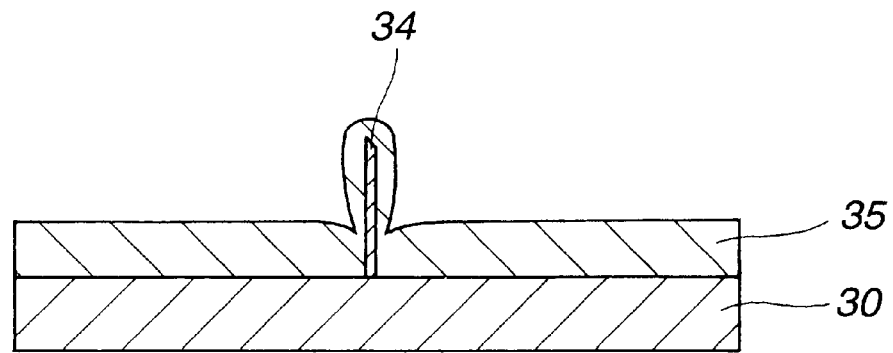
FIG. 64 is a cross-sectional view explaining the first conventional method of forming a magnetic gap, wherein a magnetic film is formed on the entire surface.
Figure 65:
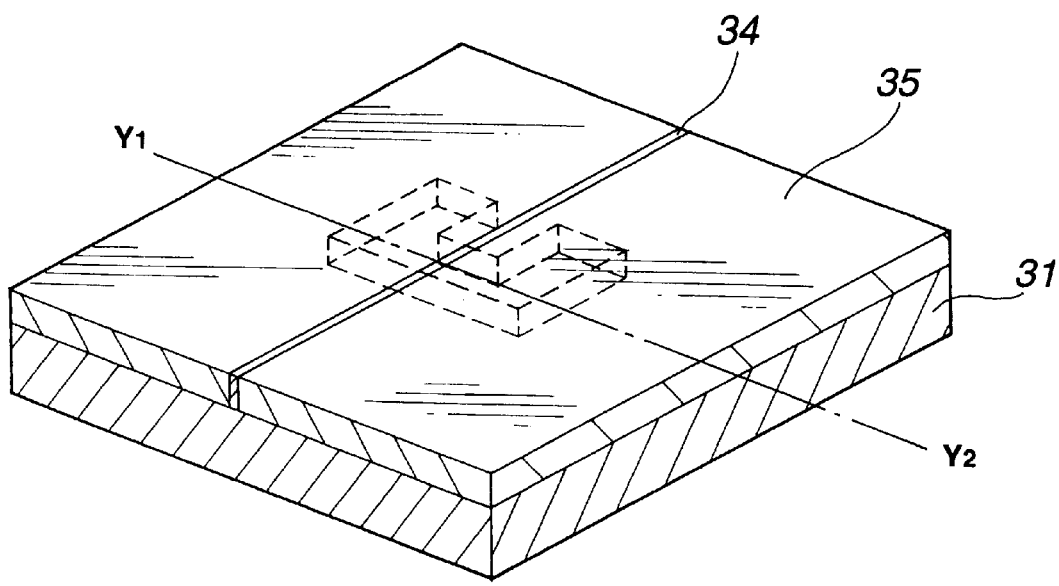
FIG. 65 is a perspective view explaining the first conventional method of forming a magnetic gap, wherein the gap film is formed to be substantially vertical to the substrate.
Figure 66:
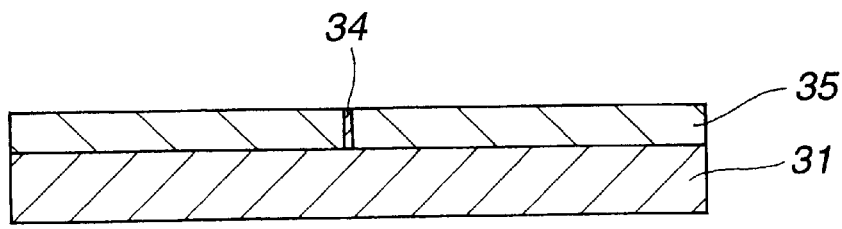
FIG. 66 is a cross-sectional view cut along the line Y1–Y2 in FIG. 65.
Figure 67:
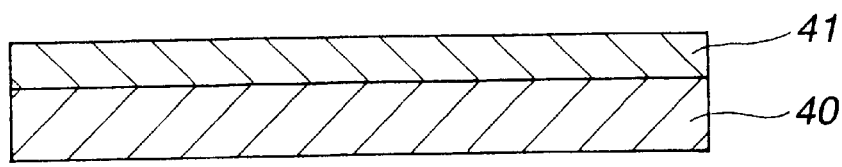
FIG. 67 is a cross-sectional view explaining a second conventional method of forming a magnetic gap, wherein a first magnetic film is formed on the entire surface on a substrate.
Figure 68:
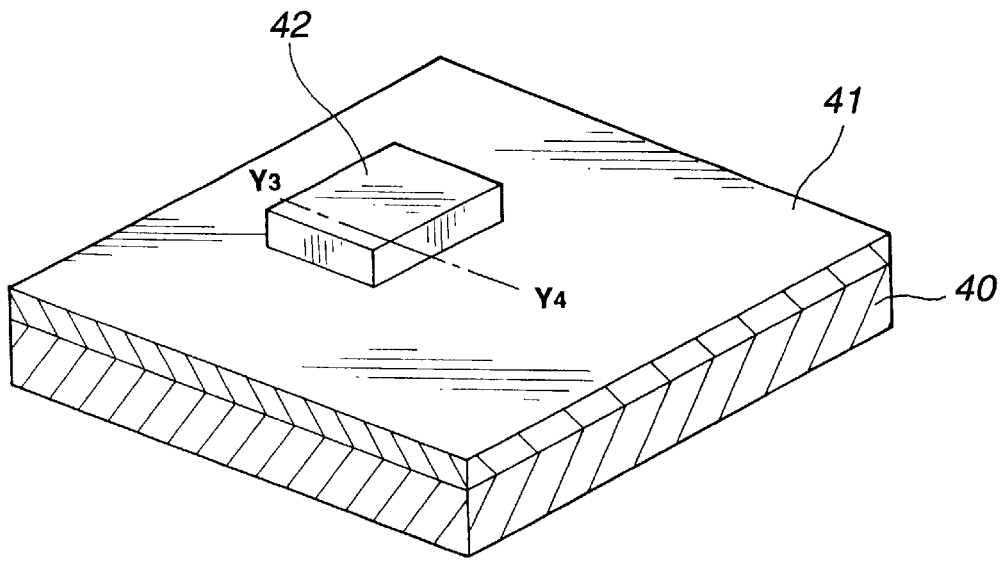
FIG. 68 is a perspective view explaining the second conventional method of forming a magnetic gap, wherein a resist applied on the first magnetic film is patterned into a predetermined shape.
Figure 69:
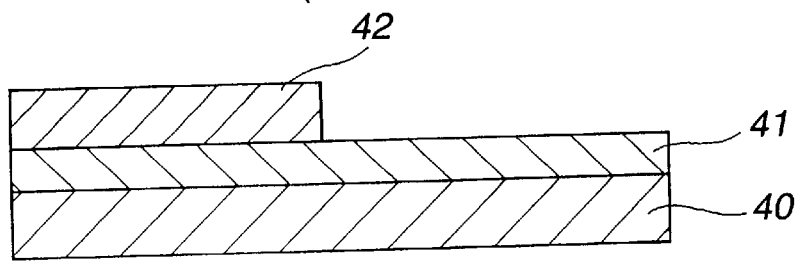
FIG. 69 is a cross-sectional view cut along the line Y3–Y4 in FIG. 68.
Figure 70:
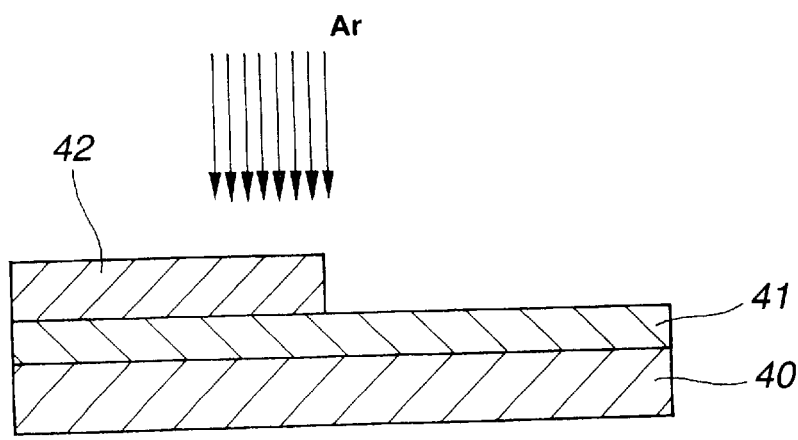
FIG. 70 is a cross-sectional view explaining the second conventional method of forming a magnetic gap, wherein the first magnetic film is etched with a mask pattern used as a mask.
Figure 71:
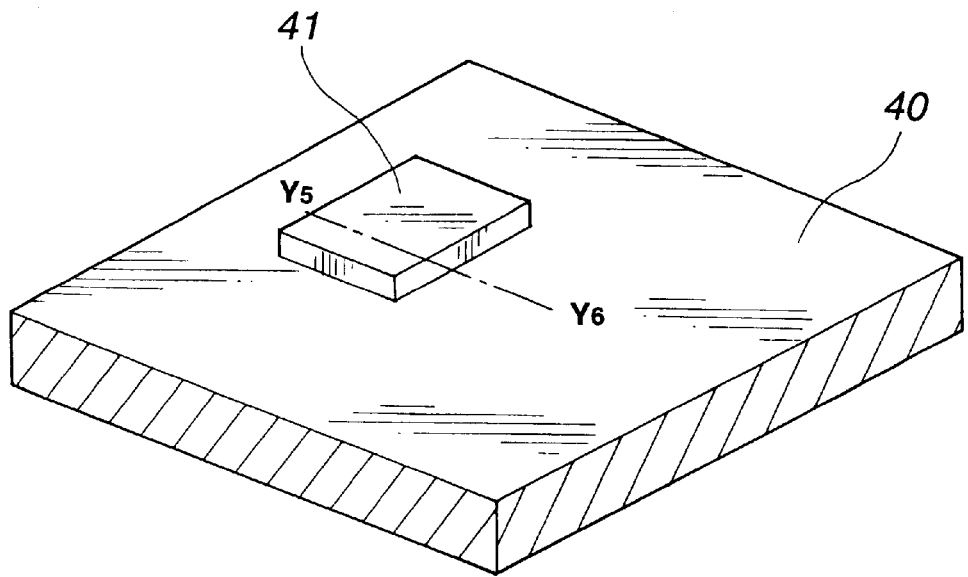
FIG. 71 is a cross-sectional view explaining the second conventional method of forming a magnetic gap, wherein a resist is removed to form one yoke core.
Figure 72:
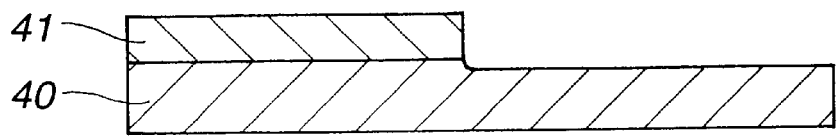
FIG. 72 is a cross-sectional view cut along the line Y5–Y6 in FIG. 71.
Figure 73:
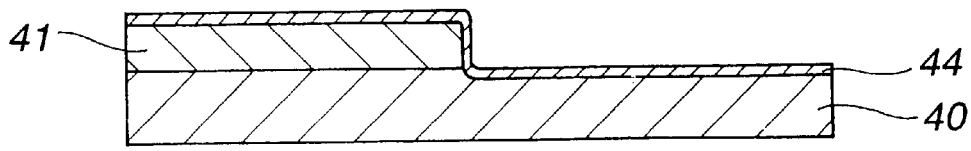
FIG. 73 is a cross-sectional view explaining the second conventional method of forming a magnetic gap, wherein a gap film is formed on the entire surface.
Figure 74:
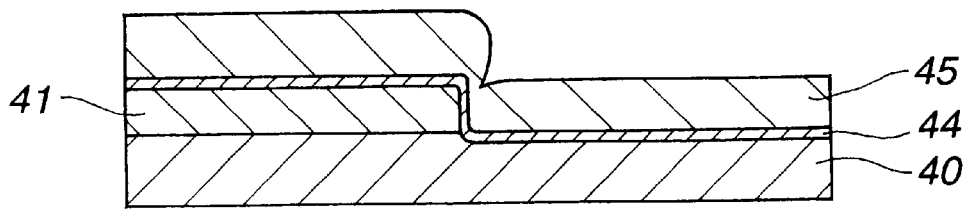
FIG. 74 is a cross-sectional view explaining the second conventional method of forming a magnetic gap, wherein a second magnetic film is formed on the gap film.
Figure 75:
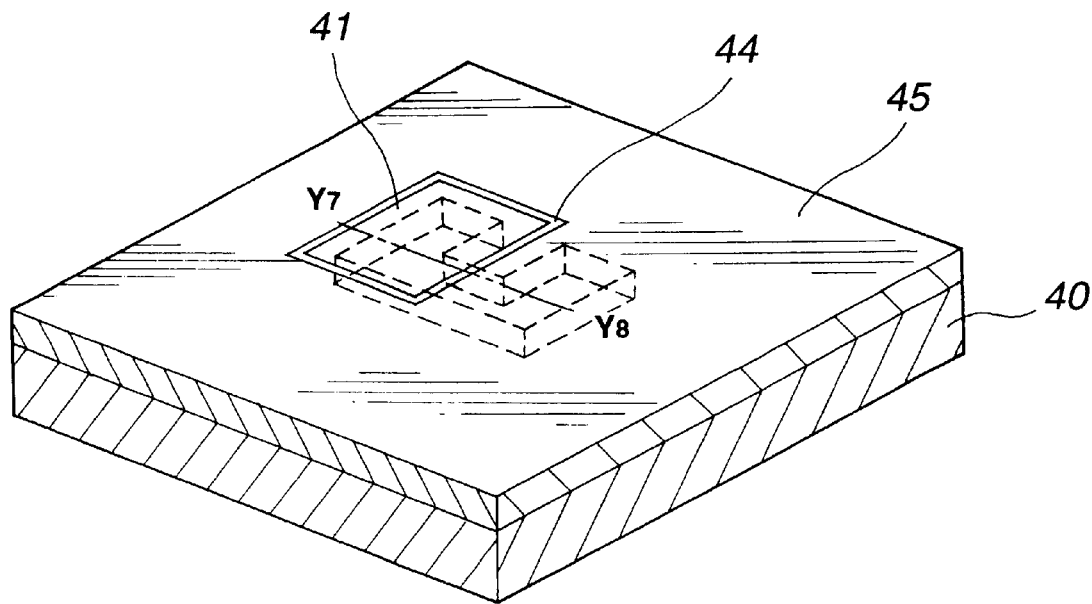
FIG. 75 is a perspective view explaining the second conventional method of forming a magnetic gap, wherein the surface of the second magnetic film is polished and the gap film is formed to be substantially vertical to the substrate.
Figure 76:
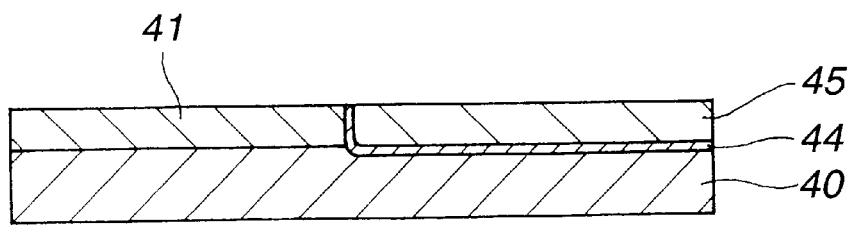
FIG. 76 is a cross-sectional view cut along the line Y7–Y8 in FIG. 75.

At last, as shown in FIG. 56, the surface 1a as the sliding surface on which the magnetic recording medium slides is polished until the end portions of the yoke cores 6a and 6b are exposed. Note that the steps shown in FIGS. 48 to 56 may adopt the same method according to the first embodiment described above.

By the steps as described above, the MR head 1 according to the second embodiment is completed.

When the MR head 1 according to the first or second embodiment is used in a helical scan tape system, for example, it is used attached to a rotation drum 20.

The MR head 1 as described above is capable of solving effectively the problem caused due to friction of the magnetic resistance effect element and is therefore very advantageous, when the head is used in a system such as a helical scanning system in which the head slides on a tape-like magnetic recording medium at a high speed to record/reproduce information. However, the MR head 1 is also applicable to a system in which the head slides on a disk-like magnetic recording medium.

Although the above embodiments have been explained with reference to a case where a mask made of Cr is used when etching the SiO2 film forming the magnetic gap. However, the present invention is not limited to this case but any masks made of various materials can be used regardless of whether the masks are metal or not as long as the mask has higher selectivity with respect to reactive ion etching in comparison with SiO2. For example, CoZrNb amorphous material may be cited as the material having such higher selectivity with respect to reactive ion etching than SiO2.

Also, the above embodiments have been explained with reference to an example of an MR head using a magnetic resistance effect element in which a soft magnetic material having an anisotropic magnetic resistance effect is formed as a film. However, the present invention is not limited to this example but is applicable also to an MR head using a huge magnetic resistance effect element which attains a huge magnetic resistance effect by adopting a multi-layer structure consisting of a plurality of layered thin films.

Further, the embodiments described above have also been explained with reference to the case of manufacturing an MR head using a magnetic resistance effect. However, the present invention is not limited hitherto but is also applicable to the case of manufacturing an inductive type magnetic head using electromagnetic induction.

In the method of manufacturing a magnetic head according to the present invention, a pair of yoke cores are formed on one same plane, and therefore, the yoke cores have same thickness, so that a MR head can be obtained without less deterioration of off-track characteristics. Also, in this method, a pair of yoke cores are formed simultaneously, the manufacturing steps are very simple. Further, in this manufacturing method, the thickness of the yoke cores is reduced, so that the width of the magnetic gap can be reduced to be small, i.e., the track width can be small.

Accordingly, in the present invention, the magnetic head which responds to high recording density can be attained very easily with high precision. Also, if a combination of a metal material and a novolak-resin-based resist is used as a mask, as indicated in the second embodiment, generation of harmful polymerized materials can be restricted so that a fine shape can be formed simply and securely.

What is claimed is:

1. A method for manufacturing a magnetic head, the method comprising the steps of:

presenting a substrate having a pair of yoke cores formed on the substrate so as to oppose each other, wherein a non-magnetic material is disposed between the pair of yoke cores so as to define a magnetic gap, and wherein the non-magnetic material comprises a first selectivity ratio with respect to reactive ion etching;

forming on the substrate a non-magnetic film made of the non-magnetic material;

forming on the non-magnetic film a high-selectivity film made of a high-selectivity material, the high-selectivity material comprising a selectivity ratio with respect to reactive ion etching that is higher than that of the non-magnetic material;

patterning the high-selectivity film into a predetermined shape to form a mask pattern; and using the mask pattern to etch the non-magnetic film by reactive ion etching.

2. A method according to claim 1 wherein the non-magnetic material is $SiO_2$.

3. A method according to claim 1 wherein the high-selectivity material is Cr.

4. A method according to claim 1, wherein The step of patterning the high-selectivity film includes applying a resist onto the high-selectivity film, exposing the resist to form a latent image of a predetermined pattern in the resist, and developing the resist to form the mask pattern.

5. A method according to claim 4, wherein the resist is an electron beam resist and wherein exposing the resist includes using an electron beam exposure device.

6. A method according to claim 1, wherein the magnetic resistance effect element is substantially rectangular and includes a first end portion and a second end portion, each magnetically connected to the pair of yoke cores, wherein the magnetic resistance effect element is configured to receive from a magnetic recording medium a magnetic flux that is guided by the pair of yoke cores.

7. A method according to claim 6, wherein the magnetic head is configured to be mounted in a helical scan tape system.

8. A method according to claim 1, after the step of patterning the high-selectivity film, the method further comprising the step of:

forming a resist made of a novolak-resin-based material on the high-selectivity film.

9. A method according to claim 8, wherein the step of forming a resist made of a novolak-resin-based material includes applying a novolak-resin-based resist onto the high-selectivity film, exposing the novolak-resin-based resist to form a latent image of a predetermined pattern in the novolak-resin-based resist, and developing the novolak-resin-based resist to form a mask pattern.

* * * * *